(12) United States Patent
Katsuki et al.

(10) Patent No.: US 8,230,740 B2
(45) Date of Patent: Jul. 31, 2012

(54) ANGULAR SPEED SENSOR AND ELECTRONIC APPARATUS

(75) Inventors: Takashi Katsuki, Kawasaki (JP); Fumihiko Nakazawa, Kawasaki (JP); Hiroaki Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 430 days.

(21) Appl. No.: 12/502,499

(22) Filed: Jul. 14, 2009

(65) Prior Publication Data
US 2010/0024547 A1    Feb. 4, 2010

(30) Foreign Application Priority Data
Jul. 29, 2008  (JP) ................................. 2008-195319

(51) Int. Cl.
*G01P 9/04* (2006.01)
*G01C 19/56* (2006.01)
(52) U.S. Cl. .................................. 73/504.14; 73/504.12
(58) Field of Classification Search ............... 73/504.12, 73/504.14, 504.15, 504.16, 504.04, 504.02
See application file for complete search history.

(56) References Cited

U.S. PATENT DOCUMENTS

| | | | | | |
|---|---|---|---|---|---|
| 5,728,936 | A | * | 3/1998 | Lutz ............................ | 73/504.14 |
| 5,945,599 | A | * | 8/1999 | Fujiyoshi et al. ........... | 73/504.12 |
| 6,321,598 | B1 | * | 11/2001 | Iwaki et al. ................. | 73/504.02 |
| 6,694,813 | B2 | | 2/2004 | Koike | |
| 6,742,390 | B2 | | 6/2004 | Mochida et al. | |
| 6,843,127 | B1 | * | 1/2005 | Chiou ......................... | 73/504.12 |
| 6,860,150 | B2 | * | 3/2005 | Cho ............................ | 73/504.12 |
| 6,978,673 | B2 | * | 12/2005 | Johnson et al. ............. | 73/504.12 |
| 7,036,373 | B2 | * | 5/2006 | Johnson et al. ............. | 73/504.14 |
| 7,043,985 | B2 | * | 5/2006 | Ayazi et al. ................. | 73/504.04 |
| 7,093,487 | B2 | * | 8/2006 | Mochida ..................... | 73/504.14 |
| 7,191,653 | B2 | * | 3/2007 | Park et al. ................... | 73/504.12 |
| 7,210,347 | B2 | * | 5/2007 | Nicu et al ................... | 73/504.12 |
| 7,591,179 | B2 | * | 9/2009 | Krieg et al. ................. | 73/504.12 |
| 7,637,155 | B2 | * | 12/2009 | Delevoye ................... | 73/504.12 |
| 2007/0022827 | A1 | | 2/2007 | Ishikawa et al. | |

FOREIGN PATENT DOCUMENTS

| | | |
|---|---|---|
| JP | 2003-028648 | 1/2003 |
| JP | 2004-163376 | 6/2004 |
| JP | 2007-033330 | 2/2007 |

* cited by examiner

*Primary Examiner* — Helen C. Kwok
(74) *Attorney, Agent, or Firm* — Fujitsu Patent Center

(57) ABSTRACT

An angular speed sensor includes two oscillating portions arranged to oscillate in X-axis direction and Y-axis direction, where the oscillating portions are spaced from each other in X-axis direction. The sensor also includes two coupling beams capable of producing a standing wave oscillation, elongated in X-axis direction and spaced from each other in Y-axis direction, with the oscillating portions located therebetween. The coupling beams are connected to a supporting substrate via fixing posts. The coupling beams are bridged by first and second link portions, the first link portion being also connected to one of the oscillating portions and the second link portion to the other. The fixing posts are connected to the coupling beams at fixed points of the standing wave oscillation. The link portions include widened portions connected to the coupling beams at the fixed points of the standing wave oscillation.

11 Claims, 23 Drawing Sheets

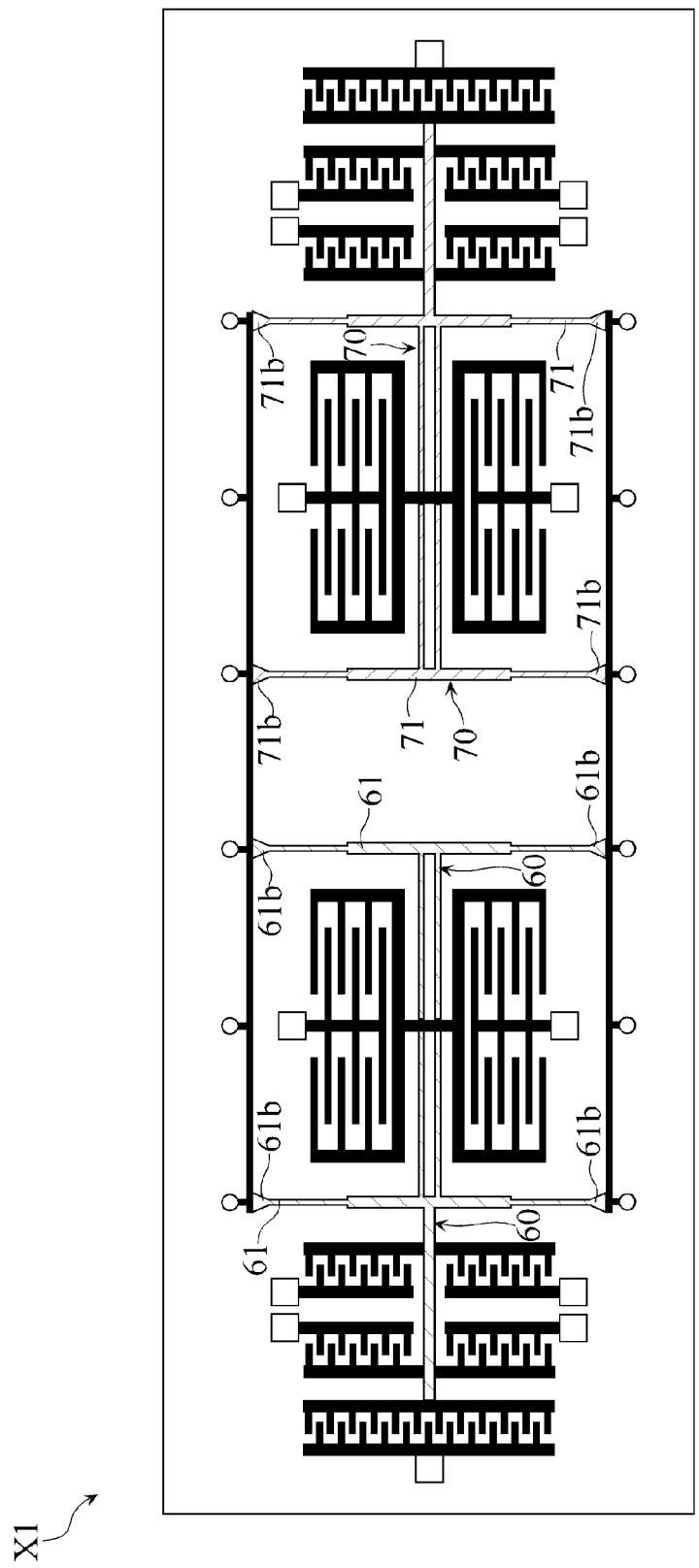

ated in FIG. 27. To be more detailed, a driving voltage is
ANGULAR SPEED SENSOR AND ELECTRONIC APPARATUS

CROSS-REFERENCE TO RELATED APPLICATION

This application is based upon and claims the benefit of priority of the prior Japanese Patent Application No. 2008-195319, filed on Jul. 29, 2008, the entire contents of which are incorporated herein by reference.

FIELD

An embodiment of the present invention relates to an angular speed sensor for detecting angular speed. Anther embodiment of the present invention relates to an electronic apparatus that incorporates such an angular speed sensor.

BACKGROUND

Recently, the application of very small elements produced through a micromachining technique has been expanding in various technical fields. An example of such elements is an angular speed sensor that includes a minute oscillating portion. The angular speed sensor is employed for shake compensation in a digital camera or a video camera against the user's hand motion, for a car navigation system, or for controlling the posture of a vehicle or a robot. Description of such angular speed sensor can be found, for example, in the following patent documents 1-3.

1. Japanese Laid-open Patent Publication No. 2003-28648
2. Japanese Laid-open Patent Publication No. 2004-163374
3. Japanese Laid-open Patent Publication No. 2007-33330

FIG. 26 depicts an angular speed sensor X5, as an example of angular speed sensor as related art. The angular speed sensor X5 includes a supporting substrate S2, oscillating portions 80A, 80B, a plurality of fixing posts 81, driving electrodes 82A, 82B, 83A, 83B, 84A, 84B, 85A, 85B, detecting electrodes 86A, 86B, 87A, 87B, a coupling beam 88, and link portions 89A, 89B. In FIG. 26, the link portions 89A, 89B located with a spacing from the supporting substrate S2 are hatched, and other portions spaced from the supporting substrate S2 other than the link portions 89A, 89B are solidly filled, for the sake of explicitness of the drawing. The fixing posts 81, the electrode pads of the driving electrodes 82A, 82B, 84A, 84B, and the electrode pads of the detecting electrodes 86A, 86B, 87A, 87B are fixed on the supporting substrate S2.

The oscillating portions 80A, 80B each include a comb electrode structure, and are capable of oscillating in an X-axis direction, as well as in a Y-axis direction. The X-axis direction and the Y-axis direction are perpendicular to each other. The fixing post 81 is provided upright on the supporting substrate S2. The driving electrodes 82A, 83A, 84A, 85A each include a comb electrode structure, and constitute a driving unit that generates a driving force to cause the oscillating portion 80A to produce reference oscillation in the X-axis direction. The driving electrodes 82B, 83B, 84B, 85B each include a comb electrode structure, and constitute a driving unit that generates a driving force to cause the oscillating portion 80B to produce the reference oscillation in the X-axis direction. The detecting electrodes 86A, 87A each include a comb electrode structure, and constitute a detector that detects displacement of the oscillating portion 80A in the Y-axis direction. The detecting electrodes 86B, 87B each include a comb electrode structure, and constitute a detector that detects displacement of the oscillating portion 80B in the Y-axis direction. The coupling beam 88 serves to couple the respective reference oscillation of the oscillating portions 80A, 80B such that the reference oscillation is caused in the opposite phases. The link portion 89A serves as a bridge between the oscillating portion 80A, a predetermined fixing post 81, the driving electrodes 83A, 85A, and the coupling beam 88, to thereby transmit the driving force generated at the driving electrodes 82A, 83A, 84A, 85A to the oscillating portion 80A and the coupling beam 88, while supporting the oscillating portion 80A. The link portion 89B serves as a bridge between the oscillating portion 80B, a predetermined fixing post 81, the driving electrodes 83B, 85B, and the coupling beam 88, to thereby transmit the driving force generated in the driving electrodes 82B, 83B, 84B, 85B to the oscillating portion 80B and the coupling beam 88, while supporting the oscillating portion 80B. The oscillating portions 80A, 80B, the driving electrodes 83A, 83B, 85A, 85B, and the coupling beam 88 constitute a movable portion in the angular speed sensor X5.

When the angular speed sensor X5 is driven, a voltage is applied to the driving electrodes 82A, 82B, 83A, 83B, 84A, 84B, 85A, 85B to thereby generate the driving force so that, ideally, the oscillating portions 80A, 80B cause the reference oscillation in the X-axis direction in opposite phases, as illustrated in FIG. 27. To be more detailed, a driving voltage is applied to the driving electrode 82A, 84B in a first period with a predetermined voltage being applied to the movable portion (including the driving electrodes 83A, 83B, 85A, 85B), to thereby generate the driving force between the driving electrodes 82A and 83A and between the driving electrodes 84B and 85B in the first period, and the driving voltage is applied to the driving electrodes 84A, 82B in a second period (ideally, at the same frequency as in the first period and half a period shifted from the first period in phase), to thereby generate the driving force between the driving electrodes 84A and 85A and between the driving electrodes 82B and 83B in the second period.

Under the state where the oscillating portions 80A, 80B are producing the reference oscillation in the X-axis direction, once an angular speed about a Z-axis is exerted to the angular speed sensor X5, and hence to the oscillating portions 80A, 80B, a Coriolis force that displaces the oscillating portions 80A, 80B in the Y-axis direction is periodically generated. Accordingly, the oscillating portions 80A, 80B each oscillate in the Y-axis direction (Coriolis oscillation), and a static capacitance between the oscillating portion 80A and the detecting electrodes 86A, 87A and that between the oscillating portion 80B and the detecting electrodes 86B, 87B are caused to fluctuate. Based on such fluctuation of the static capacitance, the displacement amount, in other words the amplitude of oscillation of the oscillating portions 80A, 80B is detected, so that the angular speed exerted on the angular speed sensor X5, and hence to the oscillating portions 80A, 80B is led out according to the detection result.

In the angular speed sensor X5, the pair of oscillating portions 80A, 80B may suffer noise oscillation for some reasons. However, by regulating the oscillating portions 80A, 80B to produce the reference oscillation with a predetermined phase difference (ideally in opposite phases), the oscillating portions 80A, 80B produce the Coriolis oscillation in the Y-axis direction with the predetermined phase difference (ideally in opposite phases) when the angular speed is exerted. Thus, it is possible to cancel the noise oscillation in detecting the displacement amount of the oscillating portions 80A, 80B. It is for such reason that the angular speed sensor X5 is provided with the oscillating portions 80A, 80B that can be made to perform the reference oscillation in opposite phases.

The coupling beam 88 in the angular speed sensor X5 serves to optimize as much as possible the phase difference in the reference oscillation of the oscillating portions 80A, 80B while they are driven (in other words, adjust the phase to be as close as possible to opposite, which is the ideal state). Without the coupling beam 88, it would be quite difficult to regulate the oscillating portions 80A, 80B so as to accurately produce the reference oscillation in opposite phases while being driven. This is because the natural oscillation frequency of the respective oscillating portions 80A, 80B is actually different, primarily because of a manufacturing tolerance of each constituent of the movable portion including the oscillating portions 80A, 80B. The structure that the coupling beam 88 mechanically connects the oscillating portions 80A, 80B via the link portions 89A, 89B allows the respective reference oscillation of the oscillating portions 80A, 80B to be mutually mechanically associated, so that the phase difference of the reference oscillation of the oscillating portions 80A, 80B can be optimized while they are driven.

In the angular speed sensor X5, however, in the case where, on the assumption that the coupling beam 88 is not provided, the phase difference in the reference oscillation is largely shifted from the ideal state when the oscillating portions 80A, 80B are individually caused to produce the reference oscillation, it may be no longer possible to optimize the phase difference of the reference oscillation to be sufficiently close to opposite, which is ideal, despite employing the coupling beam 88. In other words, the structure that the coupling beam 88 is disposed between the oscillating portions 80A, 80B may still fail to couple the respective reference oscillation of the oscillating portions 80A, 80B with sufficiently high efficiency. The decline in coupling efficiency leads to weakened mechanical association of the respective reference oscillation of the oscillating portions 80A, 80B, and to an increase in driving force necessary for generating the reference oscillation in a predetermined amplitude, which is undesirable from the viewpoint of reducing the driving voltage.

In the angular speed sensor X5, further, the driving energy that drives the oscillating portions 80A, 80B to produce the reference oscillation is prone to leak into the supporting substrate S2 through the fixing post 81. This is because the driving force generated at the driving electrodes 82A, 82B, 83A, 83B, 84A, 84B, 85A, 85B can be transmitted through the link portions 89A, 89B not only to the oscillating portions 80A, 80B but also to the fixing post 81. The leakage of a greater portion of the driving energy into the supporting substrate S2 leads to requirement of an increased driving force for generating the reference oscillation in a predetermined amplitude, which is undesirable from the viewpoint of reducing the driving voltage.

SUMMARY

Embodiments of the present invention have been proposed under the foregoing situation, and provides an angular speed sensor appropriate for coupling the respective reference oscillation of a pair of oscillating portions with high efficiency, and suppressing leakage of driving energy for generating the reference oscillation to a supporting substrate, and an electronic apparatus incorporated with such angular speed sensor.

A first aspect of the present invention provides an angular speed sensor that includes: a supporting substrate; a first oscillating portion and a second oscillating portion arranged to oscillate in a first direction and in a second direction perpendicular to the first direction, the first and the second oscillating portions being spaced from each other in the first direction; a pair of coupling beams extending in the first direction and spaced from each other in the second direction with the first and the second oscillating portions located therebetween, the coupling beams capable of producing standing wave oscillation; a plurality of fixing posts fixing the coupling beams to the supporting substrate; a first link portion serving as a bridge between the pair of coupling beams and connected to the first oscillating portion; and a second link portion serving as a bridge between the pair of coupling beams and connected to the second oscillating portion. The fixing posts are connected to the coupling beams at fixed points of the standing wave oscillation. The first and the second link portions each include a widened portion formed at an end thereof connected to the coupling beam, where the widened portion is connected to the coupling beam at a fixed point of the standing wave oscillation of the coupling beam.

To drive the angular speed sensor, a predetermined driving unit generates a driving force to be transmitted to the first and the second oscillating portion through the first and the second link portion, such that the first and the second oscillating portion are caused to produce reference oscillation in the first direction in opposite phases. Once an angular speed about an axis perpendicular to both of the first and the second direction is exerted to the first and the second oscillating portion under such state, a Coriolis force is periodically generated in the second direction in the respective oscillating portions. Accordingly, the oscillating portions each produce the Coriolis oscillation in the second direction in opposite phases. A predetermined detector then detects the displacement amount, in other words the amplitude of oscillation of the first and the second oscillating portion in the second direction, to thereby lead out the angular speed exerted on the angular speed sensor, and hence to the first and the second oscillating portion according to the detection result.

Whereas the first and the second oscillating portion are caused to produce the reference oscillation in the first direction when the angular speed sensor is driven, the pair of coupling beams connected to the first and the second oscillating portion through the first and the second link portion produce the standing wave oscillation in linkage with the reference oscillation. This is because the first and the second link portion that transmit the driving force for the reference oscillation to the first and the second oscillating portion are connected to a location where the fixed point of the standing wave oscillation of the respective coupling beam is to be included, so that when the angular speed sensor is driven the relevant connection terminal of each link portion generates a torque for generating the standing wave oscillation (torque about the fixed point) at the fixed point of each coupling beam. The standing wave oscillation of the coupling beam allows the respective reference oscillation of the first and the second oscillating portion to be coupled such that the reference oscillation is produced in opposite phases. The structure that the respective link portion is connected via the widened portion thereof to the fixed point of the standing wave oscillation of each coupling beam facilitates increasing the torque generated by the connection terminal (widened portion) of each link portion at the fixed point of each coupling beam, for generating the standing wave oscillation. Consequently, the angular speed sensor facilitates achieving high-efficiency coupling of the reference oscillation of the pair of oscillating portions.

The foregoing angular speed sensor is also appropriate for suppressing leakage of the driving energy that drives the first and the second oscillating portion to produce the reference oscillation, to the supporting substrate. Whereas the movable portion of the angular speed sensor, including the oscillating portions and the coupling beams, is fixed to the supporting substrate via a plurality of fixing posts, it is the fixed point of the standing wave oscillation of the coupling beam that the plurality of fixing posts is directly connected to the movable portion of the angular speed sensor. Such configuration suppresses the driving force or driving energy, generated by the predetermined driving unit for driving the respective oscillating portion to produce the reference oscillation and transmitted though the respective link portion, from leaking to the supporting substrate through the fixing post.

Thus, the angular speed sensor is appropriate for coupling the respective reference oscillation of a pair of oscillating portions with high efficiency, and suppressing leakage of driving energy for generating the reference oscillation to a supporting substrate. The higher coupling efficiency facilitates increasing the amplitude of the reference oscillation (in other words, reducing the driving force necessary to produce the reference oscillation in a predetermined amplitude), thereby reducing the driving voltage of the angular speed sensor. Also, reducing the driving energy leaking to the supporting substrate facilitates increasing the amplitude of the reference oscillation, and thereby reducing the driving voltage of the angular speed sensor.

A second aspect of the present invention provides another angular speed sensor that includes: a supporting substrate; a first oscillating portion and a second oscillating portion arranged to oscillate in a first direction and in a second direction perpendicular to the first direction, the first and the second oscillating portions being spaced from each other in the first direction; a pair of coupling beams extending in the first direction and spaced from each other in the second direction with the first and the second oscillating portions located therebetween, the coupling beams capable of producing standing wave oscillation; a plurality of fixing posts fixing the coupling beams to the supporting substrate; a first link portion serving as a bridge between the pair of coupling beams and connected to the first oscillating portion; and a second link portion serving as a bridge between the pair of coupling beams and connected to the second oscillating portion. The fixing posts are connected to the coupling beams at fixed points of the standing wave oscillation. The first and the second link portions each include a branched portion formed at an end thereof connected to the coupling beam, where the branched portion is connected to the coupling beam via at least two positions with a fixed point of the standing wave oscillation arranged therebetween.

To drive the angular speed sensor of the second aspect, a predetermined driving unit generates a driving force to be transmitted to the first and the second oscillating portion through the first and the second link portion, such that the first and the second oscillating portion are caused to produce the reference oscillation in the first direction in opposite phases. Once an angular speed about an axis perpendicular to both of the first and the second direction is exerted to the first and the second oscillating portion under such state, a Coriolis force is periodically generated in the second direction in the respective oscillating portions. Accordingly, the oscillating portions each produce the Coriolis oscillation in the second direction in opposite phases. A predetermined detector then detects the displacement amount, in other words the amplitude of oscillation of the first and the second oscillating portion in the second direction, to thereby lead out the angular speed exerted to the angular speed sensor, and hence to the first and the second oscillating portion according to the detection result.

Whereas the first and the second oscillating portion are caused to produce the reference oscillation in the first direction when the angular speed sensor is driven, the pair of coupling beams connected to the first and the second oscillating portion through the first and the second link portion produce the standing wave oscillation in linkage with the reference oscillation. This is because the first and the second link portion that transmit the driving force for the reference oscillation to the first and the second oscillating portion are connected to a local region where the fixed point of the standing wave oscillation of the respective coupling beam is to be included, so that when the angular speed sensor is driven the relevant connection terminal of each link portion generates a torque for generating the standing wave oscillation (torque about the fixed point) in the local region including the fixed point of each coupling beam. The standing wave oscillation of the coupling beam allows the reference oscillation of the first and the second oscillating portion to be coupled such that the reference oscillation is produced in opposite phases. The structure that the respective link portion is connected via the branched portion thereof to the coupling beam, at least at two locations between which the fixed point of the standing wave oscillation of each coupling beam, facilitates increasing the torque generated by the connection terminal (branched portion) of each link portion in the local region including the fixed point of each coupling beam, for generating the standing wave oscillation. Consequently, the angular speed sensor facilitates achieving high-efficiency coupling of the respective reference oscillation of the pair of oscillating portions.

Also, the angular speed sensor according to the second aspect is appropriate for suppressing leakage of driving energy for generating the reference oscillation to a supporting substrate, for the same reason as described regarding the angular speed sensor of the first aspect.

Thus, the angular speed sensor according to the second aspect is appropriate for coupling the respective reference oscillation of a pair of oscillating portions with high efficiency, and suppressing leakage of driving energy for generating the reference oscillation to a supporting substrate.

A third aspect of the present invention provides an electronic apparatus provided with an angular speed sensor according to the first or second aspect of the present invention. The electronic apparatus can be exemplified by a digital camera or video camera, a car navigation system, and a posture control system of a vehicle or a robot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a plan view illustrating a variation of the angular speed sensor of FIG. 1;

DESCRIPTION OF EMBODIMENTS

Figure 1:
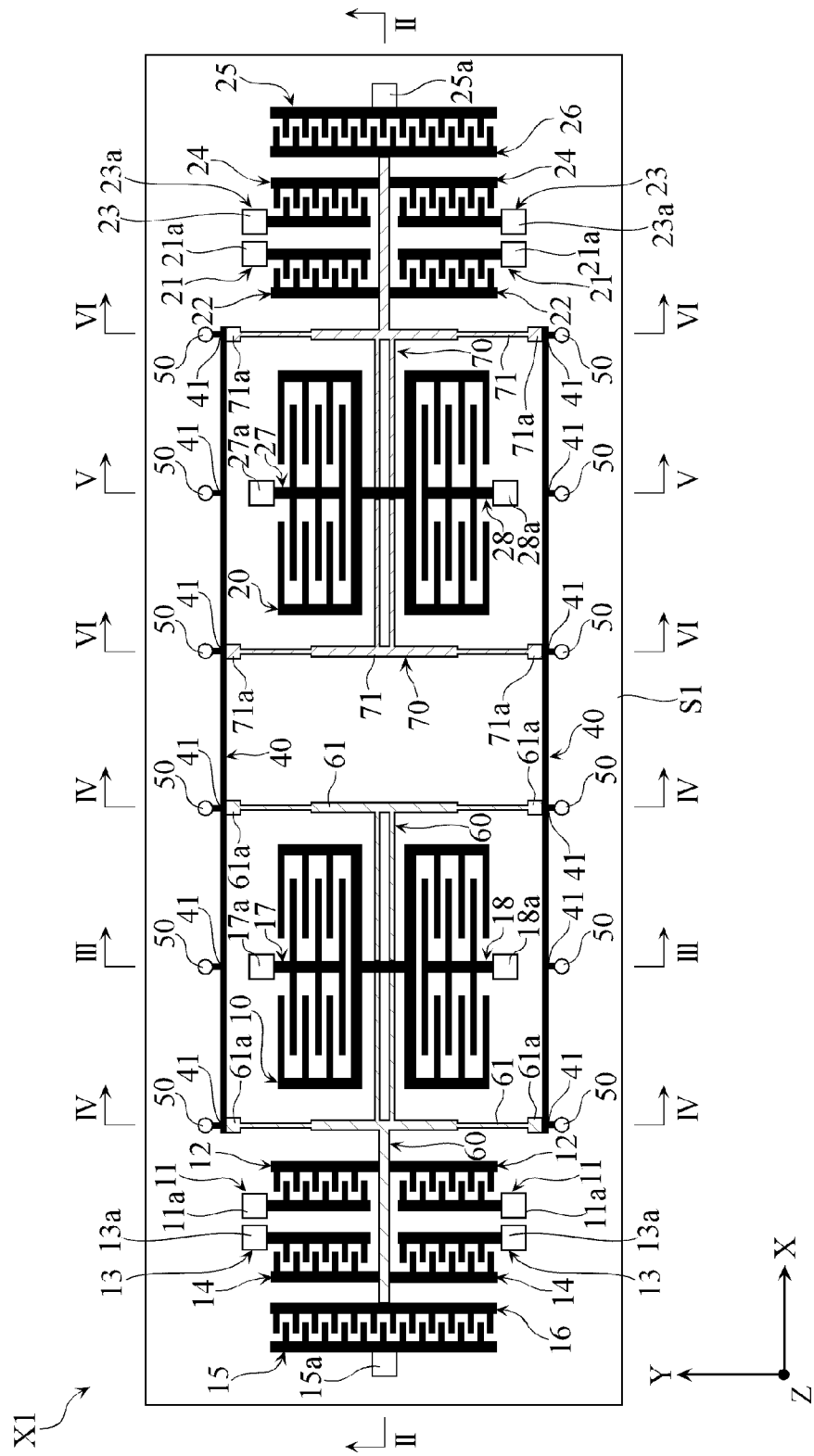
FIG. 1 is a plan view illustrating an angular speed sensor according to a first embodiment of the present invention.
Figure 2:
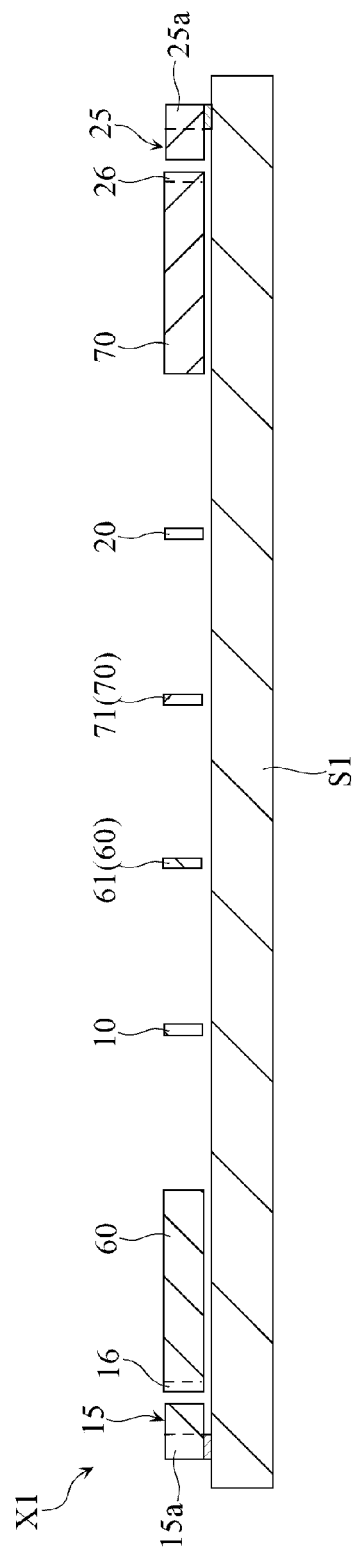
FIG. 2 is a cross-sectional view taken along a line II-II in FIG. 1.

FIGS. 1 to 6 depict an angular speed sensor X1 according to a first embodiment of the present invention. FIG. 1 is a plan view of the angular speed sensor X1. FIG. 2 is a cross-sectional view taken along a line II-II in FIG. 1, and FIGS. 3 to 6 are enlarged cross-sectional views taken along a line III-III, IV-IV, V-V, and VI-VI in FIG. 1, respectively.

The angular speed sensor X1 includes a supporting substrate S1, oscillating portions 10, 20, driving electrodes 11, 12, 13, 14, 21, 22, 23, 24, monitor electrodes 15, 16, 25, 26, detecting electrodes 17, 18, 27, 28, a pair of coupling beams 40, a plurality of fixing posts 50, and link portions 60, 70. In FIG. 1, the link portions 60, 70 located with a spacing from the supporting substrate S1 are hatched, and other portions spaced from the supporting substrate S1 other than the link portions 60, 70 are solidly filled, for the sake of explicitness of the drawing.

The oscillating portion 10 is partially constituted of a comb electrode structure including a plurality of electrode fingers, and is capable of oscillating in an X-axis direction as well as a Y-axis direction on the supporting substrate S1, as illustrated in FIG. 1. The oscillating portion 20 is partially constituted of a comb electrode structure including a plurality of electrode fingers, and is capable of oscillating in the X-axis direction as well as the Y-axis direction on the supporting substrate S1. The oscillating portion 10, 20 are spaced from each other in the X-axis direction. The X-axis direction and the Y-axis direction are perpendicular to each other.

The driving electrode 11 has a comb electrode structure including a plurality of electrode fingers, and includes an electrode pad 11a. The electrode pad 11a is fixed to the supporting substrate S1. The driving electrode 11 is a fixed driving electrode. The driving electrode 12 has a comb electrode structure including a plurality of electrode fingers, and extends from the link portion 60. The driving electrode 12 is a movable driving electrode. The driving electrodes 11, 12 constitute a driving unit that generates a driving force (static attractive force) for causing the oscillating portion 10 to produce the reference oscillation in the X-axis direction.

The driving electrode 13 has a comb electrode structure including a plurality of electrode fingers, and includes an electrode pad 13a. The electrode pad 13a is fixed to the supporting substrate S1. The driving electrode 13 is a fixed driving electrode. The driving electrode 14 has a comb electrode structure including a plurality of electrode fingers, and extends from the link portion 60. The driving electrode 14 is a movable driving electrode. The driving electrodes 13, 14 constitute a driving unit that generates a driving force (static attractive force) for causing the oscillating portion 10 to produce the reference oscillation in the X-axis direction.

The monitor electrode 15 has a comb electrode structure including a plurality of electrode fingers, and includes an electrode pad 15a. The electrode pad 15a is fixed to the supporting substrate S1 as illustrated in FIG. 2. The monitor electrode 15 is a fixed monitor electrode. The monitor electrode 16 has a comb electrode structure including a plurality of electrode fingers, and extends from the link portion 60. The monitor electrode 16 is a movable monitor electrode. The monitor electrodes 15, 16 constitute a detector that detects a displacement amount of the oscillating portion 10 in the X-axis direction based on fluctuation of static capacitance.

Figure 3:
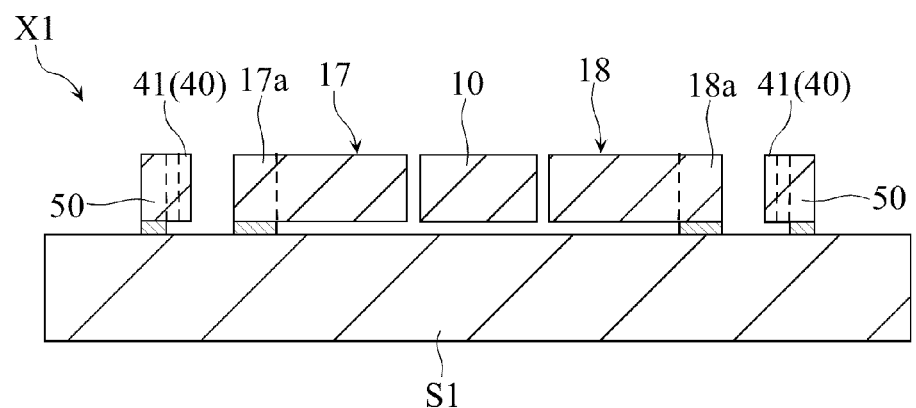
FIG. 3 is an enlarged cross-sectional view taken along a line III-III in FIG. 1.

The detecting electrode 17 has a comb electrode structure including a plurality of electrode fingers, and includes an electrode pad 17a. The electrode pad 17a is fixed to the supporting substrate S1 as illustrated in FIG. 3. The detecting electrode 18 has a comb electrode structure including a plurality of electrode fingers, and includes an electrode pad 18a. The electrode pad 18a is fixed to the supporting substrate S1. The detecting electrodes 17, 18 constitute a detector that detects a displacement amount of the oscillating portion 10 in the Y-axis direction based on fluctuation of static capacitance.

The driving electrode 21 has a comb electrode structure including a plurality of electrode fingers, and includes an electrode pad 21a. The electrode pad 21a is fixed to the supporting substrate S1. The driving electrode 21 is a fixed driving electrode. The driving electrode 22 has a comb electrode structure including a plurality of electrode fingers, and extends from the link portion 70. The driving electrode 22 is a movable driving electrode. The driving electrodes 21, 22 constitute a driving unit that generates a driving force for causing the oscillating portion 20 to produce the reference oscillation in the X-axis direction.

The driving electrode 23 has a comb electrode structure including a plurality of electrode fingers, and includes an electrode pad 23a. The electrode pad 23a is fixed to the supporting substrate S1. The driving electrode 23 is a fixed driving electrode. The driving electrode 24 has a comb electrode structure including a plurality of electrode fingers, and extends from the link portion 70. The driving electrode 24 is a movable driving electrode. The driving electrodes 23, 24 constitute a driving unit that generates a driving force for causing the oscillating portion 20 to produce the reference oscillation in the X-axis direction.

The monitor electrode 25 has a comb electrode structure including a plurality of electrode fingers, and includes an electrode pad 25a. The electrode pad 25a is fixed to the supporting substrate S1 as illustrated in FIG. 2. The monitor electrode 25 is a fixed monitor electrode. The monitor electrode 26 has a comb electrode structure including a plurality of electrode fingers, and extends from the link portion 70. The monitor electrode 26 is a movable monitor electrode. The monitor electrodes 25, 26 constitute a detector that detects a displacement amount of the oscillating portion 20 in the X-axis direction.

Figure 5:
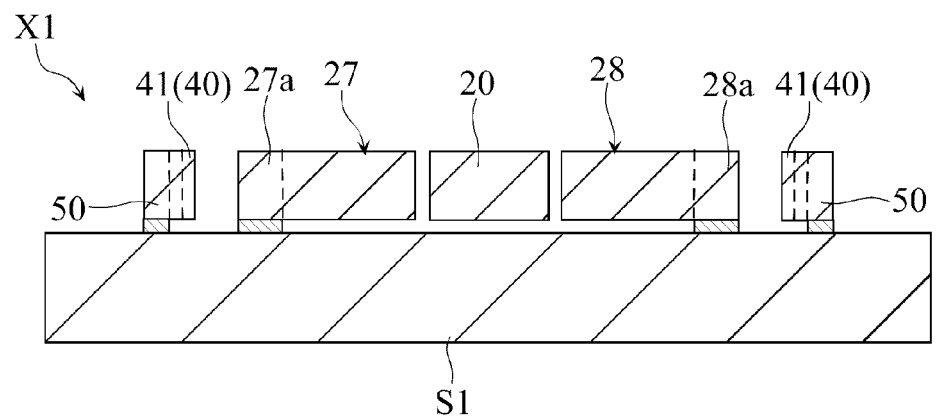
FIG. 5 is an enlarged cross-sectional view taken along a line V-V in FIG. 1.

The detecting electrode 27 has a comb electrode structure including a plurality of electrode fingers, and includes an electrode pad 27a. The electrode pad 27a is fixed to the supporting substrate S1 as illustrated in FIG. 5. The detecting electrode 28 has a comb electrode structure including a plurality of electrode fingers, and includes an electrode pad 28a. The electrode pad 28a is fixed to the supporting substrate S1. The detecting electrodes 27, 28 constitute a detector that detects a displacement amount of the oscillating portion 20 in the Y-axis direction based on fluctuation of static capacitance.

The pair of coupling beams 40 serves to couple the respective reference oscillation of the oscillating portions 10, 20 in the X-axis direction such that the reference oscillation occurs in opposite phases, and each extends in the X-axis direction and is spaced from each other in the Y-axis direction. The oscillating portions 10, 20 are located between the pair of coupling beams 40. Each of the coupling beams 40 can oscillate to produce a standing wave.

The fixing posts 50, each serving to fix the relevant coupling beam 40 to the supporting substrate S1, are provided upright on the supporting substrate S1 and connected to the coupling beam 40, as illustrated in FIGS. 3 to 6. The position where each fixing post 50 is connected to the coupling beam 40 is a fixed point 41 (or a local region including this fixed point) of the standing wave oscillation of the coupling beam 40. In this embodiment, the plurality of fixing posts 50 are connected to the coupling beam 40 at positions dividing the coupling beam 40 equally in five segments in the longitudinal direction, and each fixing post 50 is connected to the outer side of the coupling beam 40, that is, the side opposite to the oscillating portions 10, 20.

Figure 4:
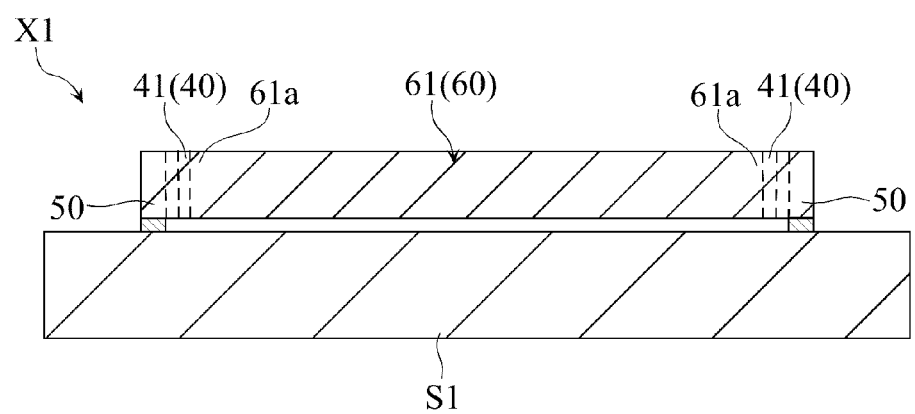
FIG. 4 is an enlarged cross-sectional view taken along a line IV-IV in FIG. 1.

The link portion 60 serves for communication between the oscillating portion 10, the driving electrodes 12, 14, the monitor electrode 16, and the coupling beam 40, and is connected thereto. The link portion 60 also includes a pair of beams 61 extending in the Y-axis direction. The beams 61 each serve as a bridge between the pair of coupling beams 40 as illustrated in FIG. 4. The beam 61 includes a widened portion 61a formed at an end portion connected to the coupling beam 40. The connection point of the widened portion 61a and the coupling beam 40 is the fixed point (local region including the fixed point 41) of the standing wave oscillation of the coupling beam 40. The widened portion 61a formed on the beam 61 extending in the Y-axis direction has a uniform width.

Figure 6:
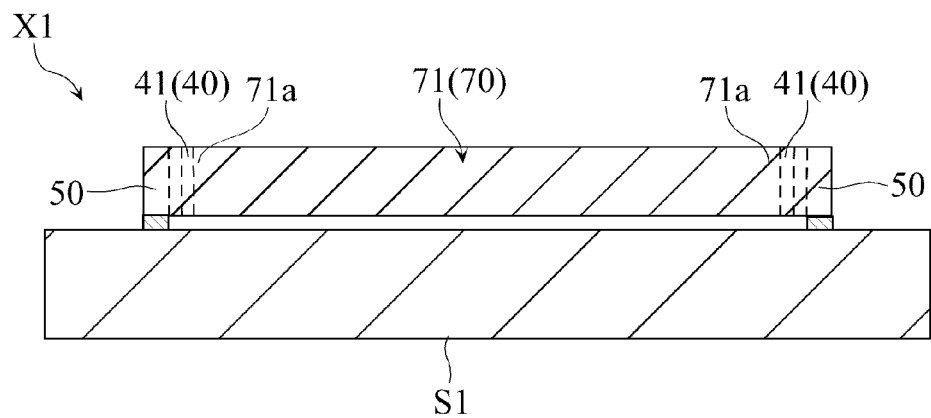
FIG. 6 is an enlarged cross-sectional view taken along a line VI-VI in FIG. 1.

The link portion 70 serves for communication between the oscillating portion 20, the driving electrodes 22, 24, the monitor electrode 26, and the coupling beam 40, and is connected thereto. The link portion 70 also includes a pair of beams 71 extending in the Y-axis direction. The beams 71 each serve as a bridge between the pair of coupling beams 40 as illustrated in FIG. 6. The beam 71 includes a widened portion 71a formed at an end portion connected to the coupling beam 40. The connection point of the widened portion 71a and the coupling beam 40 is the fixed point (local region including the fixed point 41) of the standing wave oscillation of the coupling beam 40.

Figure 7:
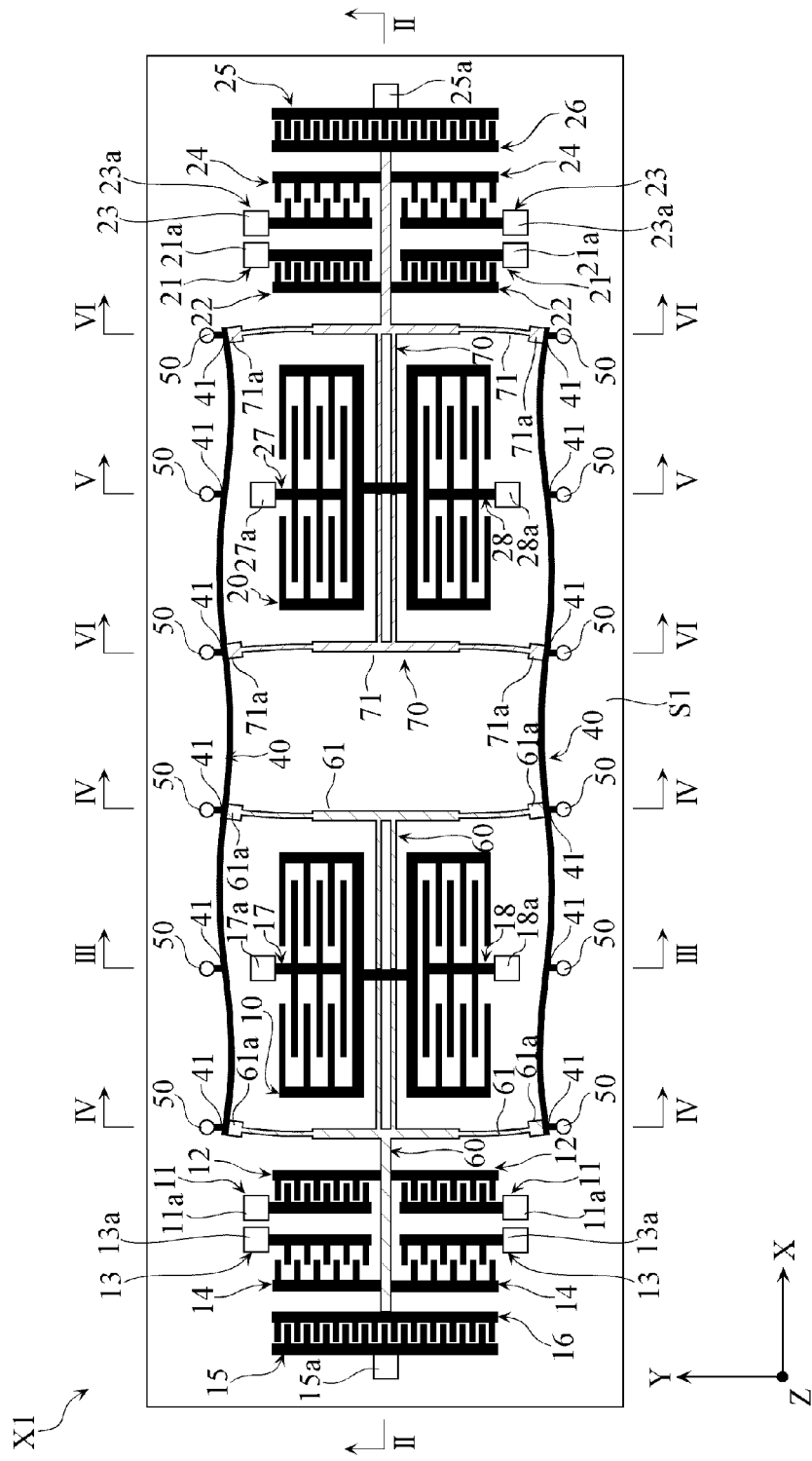
FIG. 7 is a plan view illustrating the angular speed sensor of FIG. 1 being driven.
Figure 8:
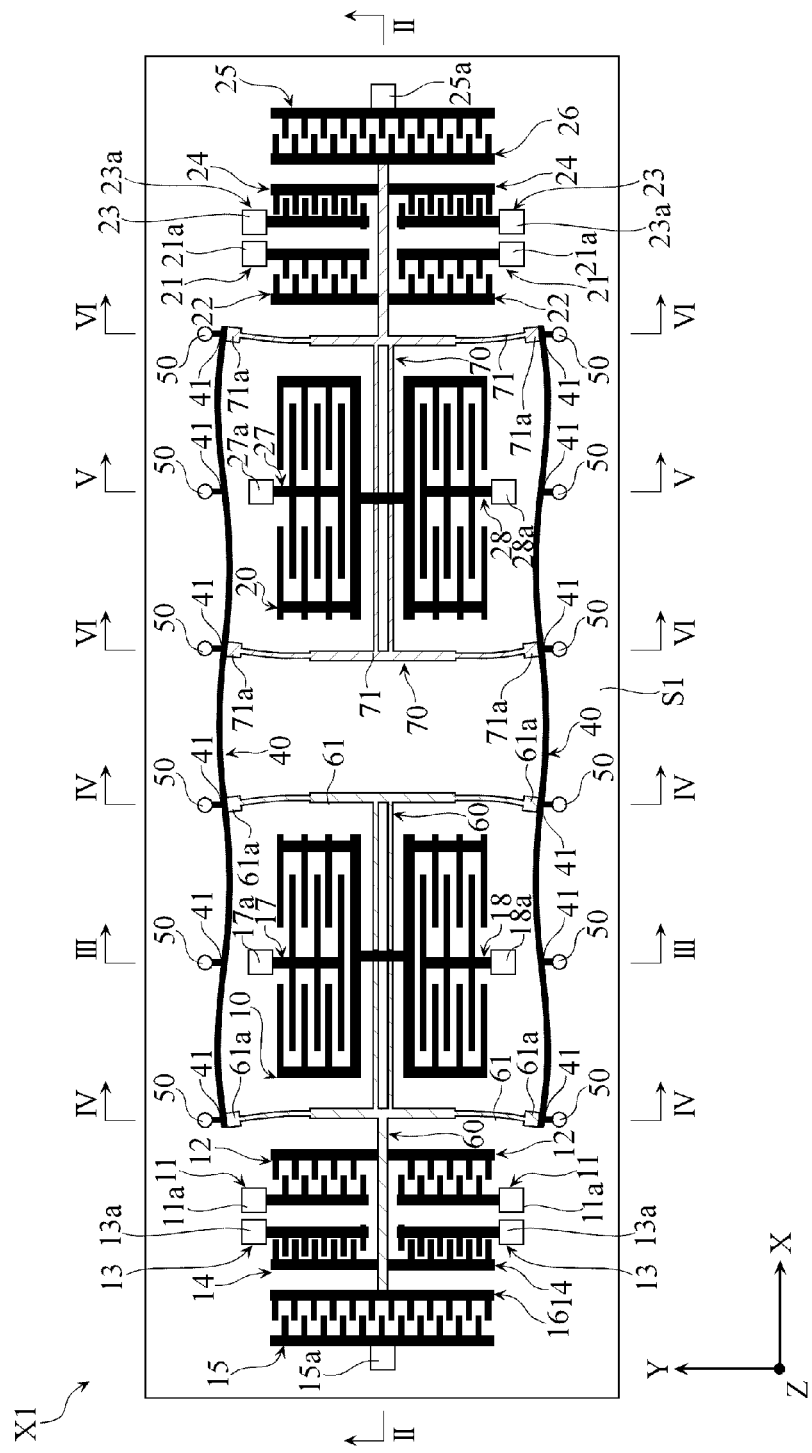
FIG. 8 is another plan view illustrating the angular speed sensor of FIG. 1 being driven.

When the angular speed sensor X1 is driven, the oscillating portions 10, 20 produce the reference oscillation in the X-axis direction in opposite phases, as illustrated in FIGS. 7 and 8. The reference oscillation may be attained, for example, by applying a predetermined bias voltage to the oscillating portions 10, 20 and the driving electrodes 12, 14, 22, 24, and applying under such state a sine wave voltage (driving voltage) to the driving electrodes 11, 23 while applying the sine wave voltage (driving voltage) of opposite phases (phase difference of 180°) to the driving electrodes 13, 21. In this process, the bias voltage may be applied to the oscillating portions 10, 20 and the driving electrodes 12, 14, 22, 24 through at least one of the fixing posts 50, the coupling beam 40 connected thereto, and the link portions 60, 70, and the driving voltage may be applied to the driving electrodes 11, 13, 21, 23 through the respective electrode pads 11a, 13a, 21a, 23a.

When the angular speed sensor X1 is driven, the pair of coupling beams 40 connected to the oscillating portions 10, 20 and the driving electrodes 12, 14, 22, 24 through the link portions 60, 70 produce the standing wave oscillation in linkage with the reference oscillation of the oscillating portions 10, 20. This is because the link portions 60, 70 that transmit the driving force for the reference oscillation to the oscillating portions 10, 20 are connected to the region to include the fixed point 41 of the standing wave oscillation of the respective coupling beams 40, so that when the angular speed sensor X1 is driven the relevant connection terminal of the link portions 60, 70 generates a torque for generating the standing wave oscillation (torque about the fixed point 41) at the fixed point of each coupling beam 40. The standing wave oscillation of the coupling beam 40 allows the respective reference oscillation of the oscillating portions 10, 20 to be coupled in opposite phases.

When the angular speed sensor X1 is driven, further, the monitor electrodes 15, 16, 25, 26 serve to maintain the resonance of the movable portion in such oscillation mode that the oscillating portions 10, 20 produce the reference oscillation in opposite phases. To be more detailed, in a circuit not illustrated the displacement amount of the oscillating portion 10 in the X-axis direction is detected based on the fluctuation of static capacitance between the monitor electrodes 15, 16, and the detection result is fed back to the driving voltage to be applied to the driving electrodes 11, 13 so that the phase and amplitude of the driving voltage (sine wave voltage) is microadjusted, and also the displacement amount of the oscillating portion 20 in the X-axis direction is detected based on the fluctuation of static capacitance between the monitor electrodes 25, 26, and the detection result is fed back to the driving voltage to be applied to the driving electrodes 21, 23 so that the phase and amplitude of the driving voltage (sine wave voltage) is microadjusted.

Figure 9:
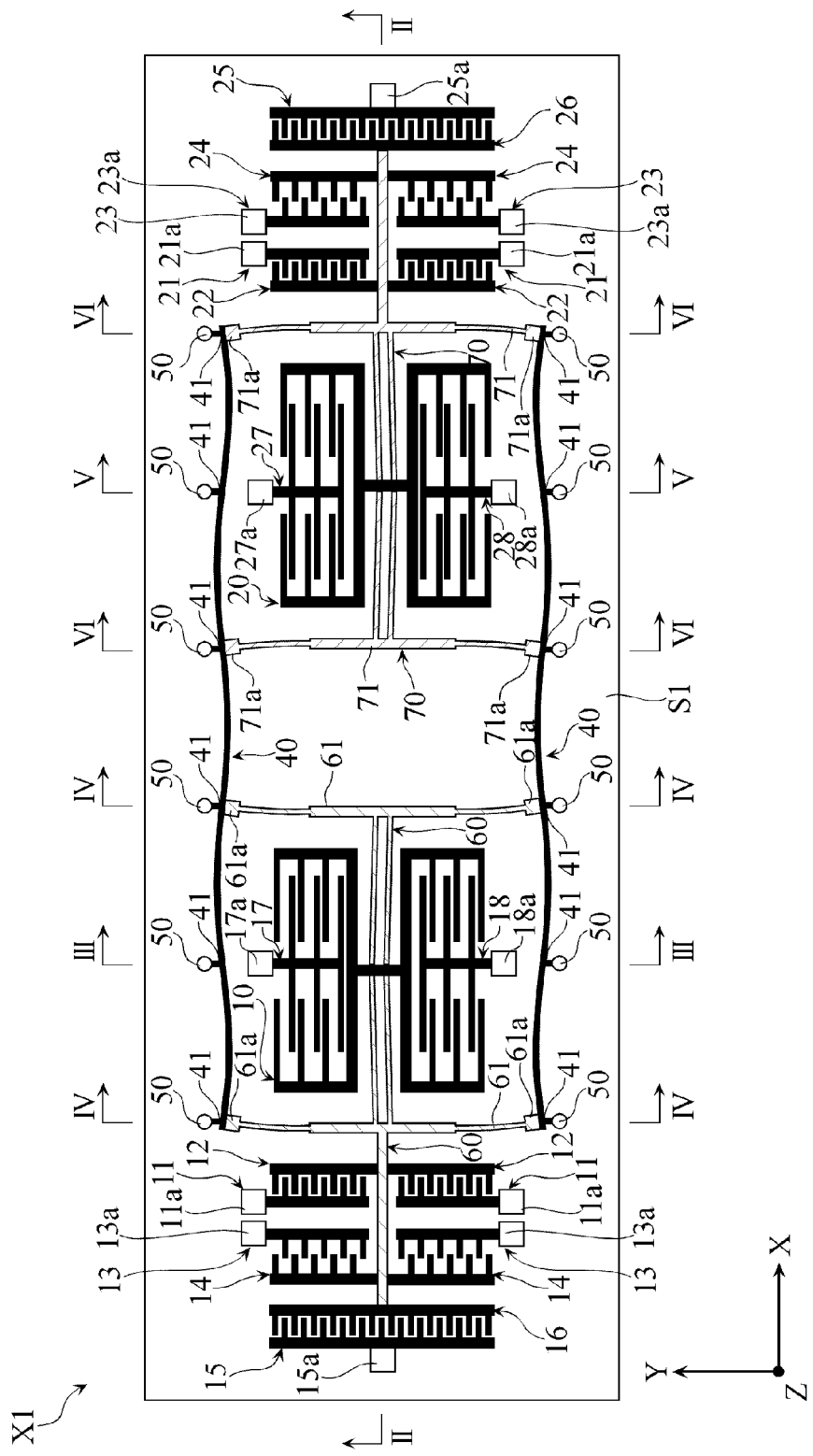
FIG. 9 is a plan view illustrating the angular speed sensor of FIG. 1 being driven, with an angular speed exerted thereto.

Once an angular speed about the Z-axis (perpendicular to both X-axis and Y-axis) is exerted to the angular speed sensor X1, and hence to the oscillating portions 10, 20 while the oscillating portions 10, 20 are producing the reference oscillation in opposite phases as above, a Coriolis force is periodically generated so as to displace the oscillating portions 10, 20 in the Y-axis direction. Accordingly, for example as illustrated in FIG. 9, the oscillating portions 10, 20 each produce the Coriolis oscillation in the Y-axis direction in opposite phases, to thereby incur fluctuation of the static capacitance between the oscillating portion 10 and the detecting electrodes 17, 18, as well as between the oscillating portion 20 and the detecting electrodes 27, 28. Then the displacement amount, in other words the amplitude of oscillation of the oscillating portions 10, 20 is detected based on the fluctuation of the static capacitance, so that the angular speed exerted to the angular speed sensor X1, and hence to the oscillating portions 10, 20 is led out, according to the detection result.

The configuration that the respective link portions 60, 70 are connected via the widened portion 61a, 71a to the fixed point of the standing wave oscillation of each coupling beam 40 facilitates, upon driving the angular speed sensor X1, increasing the torque for the standing wave oscillation (torque about the fixed point 41) generated by the connection terminal (widened portion 61a, 71a) of each link portion 60, 70 at the fixed point of the standing wave oscillation of each coupling beam 40. Consequently, the angular speed sensor X1 facilitates achieving high-efficiency coupling of the respective reference oscillation of the pair of oscillating portions 10, 20.

The angular speed sensor X1 is also appropriate for suppressing leakage of the driving energy that drives the oscillating portions 10, 20 to produce the reference oscillation, to the supporting substrate S1. Whereas the movable portion of the angular speed sensor X1, including the oscillating portions 10, 20 and the coupling beam 40, is fixed to the supporting substrate S1 via the plurality of fixing posts 50, it is the fixed point of the standing wave oscillation of the coupling beam 40 that the plurality of fixing posts 50 are directly connected to the movable portion of the angular speed sensor X1. Such configuration suppresses the leakage to the supporting substrate S1 through the fixing posts 50, of the driving force or driving energy, generated between the driving electrodes 11 and 12 and between the driving electrodes 13 and 14 and transmitted though the link portion 60, for driving the oscillating portion 10 to produce the reference oscillation, also generated between the driving electrodes 21 and 22 and between the driving electrodes 23 and 24 and transmitted though the link portion 70, for driving the oscillating portion 20 to produce the reference oscillation.

Thus, the angular speed sensor X1 is appropriate for coupling the respective reference oscillation of the oscillating portions 10, 20 with high efficiency, and suppressing leakage of the driving energy for generating the reference oscillation to the supporting substrate S1. The higher coupling efficiency facilitates increasing the amplitude of the reference oscillation (in other words, reducing the driving force necessary to produce the reference oscillation in a predetermined amplitude), thereby reducing the driving voltage of the angular speed sensor X1. Also, reducing the driving energy leaking to the supporting substrate S1 facilitates increasing the amplitude of the reference oscillation, and thereby reducing the driving voltage of the angular speed sensor X1.

Figure 10A:
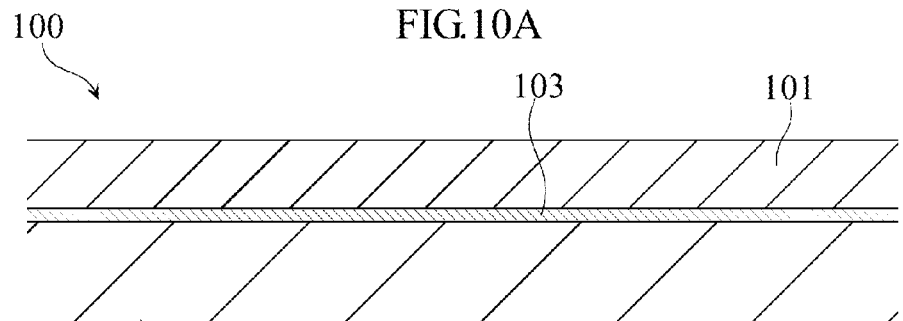
FIGS. 10A to 10D are cross-sectional views sequentially illustrating a manufacturing process of the angular speed sensor illustrated in FIG. 1.
Figure 10B:
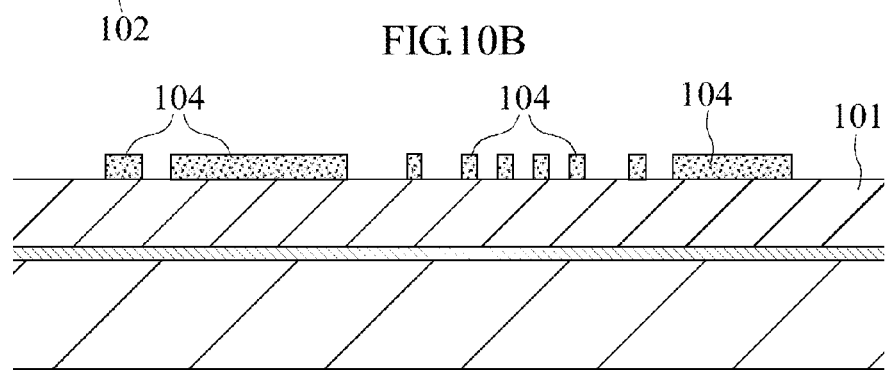
Figure 10C:
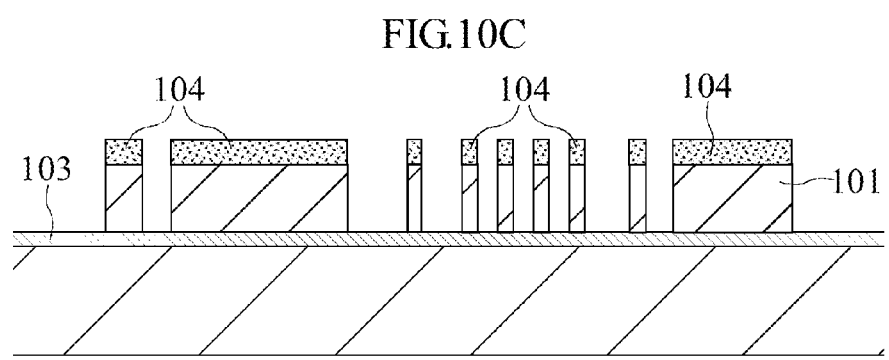
Figure 10D:
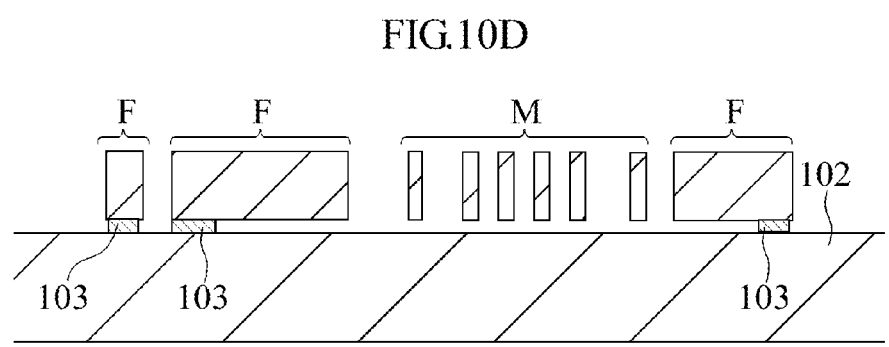

FIGS. 10A to 10D illustrate a manufacturing process of the angular speed sensor X1. The process is based on the bulk micromachining technique. Through FIGS. 10A to 10D, the formation process of the movable portion M and a fixed portion F illustrated in FIG. 10D is sequentially illustrated in a form of a cross-sectional view of the same portion. The sequential cross-sectional views represent a model from a plurality of predetermined portions included in a single formation region of an angular speed sensor in a material substrate (wafer of a multilayer structure) to be processed. The movable portion M corresponds to the oscillating portions 10, 20, the driving electrodes 12, 14, 22, 24, the monitor electrodes 16, 26, the pair of coupling beams 40, and the link portions 60, 70. The fixed portion F corresponds to the driving electrodes 11, 13, 21, 23, the monitor electrodes 15, 25, the detecting electrodes 17, 18, 27, 28, and the fixing posts 50.

To manufacture the angular speed sensor X1, a material substrate 100 as illustrated in FIG. 10A is first prepared. The material substrate 100 is a SOI wafer having a multilayer structure including silicon layers 101, 102, and an insulating layer 103 provided therebetween, and the silicon layers 101, 102 are constituted of a silicon material doped with an impurity to be made conductive. Suitable examples of the impurity include a p-type impurity such as B, and an n-type impurity such as P or Sb. The insulating layer 103 is constituted of silicon oxide, for example. An exemplary thickness of the silicon layer 101 is 20 to 200 μm, that of the silicon layer 102 50 to 500 μm, and that of the insulating layer 103 0.5 to 3 μm.

After patterning a metal layer (not illustrated) when necessary on the foregoing electrode pads, a resist pattern 104 is formed on the silicon layer 101 as illustrated in FIG. 10B. The resist pattern 104 is formed in a pattern corresponding to the oscillating portions 10, 20, the driving electrodes 11 to 14 and 21 to 24, the monitor electrodes 15, 16, 25, 26, the detecting electrodes 17, 18, 27, 28, the pair of coupling beams 40, the fixing posts 50, and the link portions 60, 70 illustrated in FIG. 1.

Referring then to FIG. 10C, a deep reactive ion etching (DRIE) process is performed utilizing the resist pattern 104 as the mask, over the silicon layer 101 so as to reach the insulating layer 103. The DRIE process enables performing excellent anisotropic etching in a Bosch process that alternately repeats etching with $SF_6$ gas and protection of sidewall with $C_4F_8$ gas. Such Bosch process may also be employed in the DRIE process to be subsequently described.

Then the resist pattern 104 is removed. A stripping solution may be employed for removing the resist pattern 104 from the material substrate 100.

An etching process is then performed so as to form an undercut, as illustrated in FIG. 10D, in a region of the insulating layer 103 between the movable portion M and the silicon layer 102, and between a part of the fixed portion F and the silicon layer 102. Either of a dry etching process or a wet etching process may be employed. In the case of the dry etching, for example vapor HF, $CF_4$, or $HF_3$ may be employed as the etching gas. For the wet etching, for example buffered hydrofluoric acid (BHF) composed of fluoric acid and aluminum fluoride may be employed as the etching solution.

Throughout the foregoing series of processes, the movable portion M and the fixed portion F can be obtained, to thereby manufacture the angular speed sensor X1.

FIG. 11 depicts a variation of the angular speed sensor X1. The angular speed sensor X1 may include widened portions 61b, 71b at the end portions of the beams 61, 71 of the link portions 60, 70, instead of the widened portions 61a, 71a, respectively. The widened portions 61b, 71b have a gradually widening shape toward the coupling beam 40 in a plan view as illustrated in FIG. 11. Such configuration alleviates concentration of deformation stress generated at the end portion of the beams 61, 71 in a driving (oscillating) stage.

Figure 12:
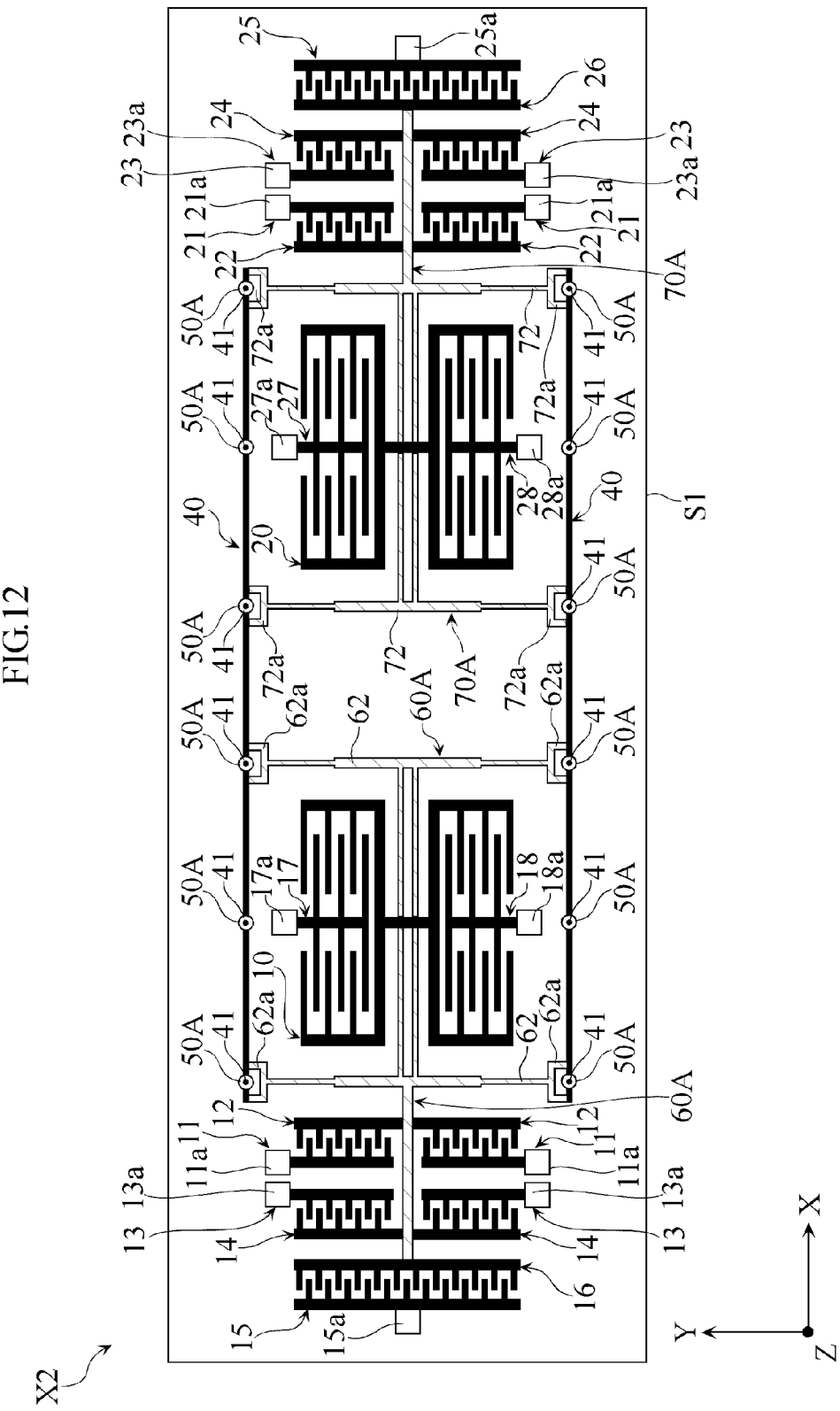
FIG. 12 is a plan view illustrating an angular speed sensor according to a second embodiment of the present invention.

FIG. 12 is a plan view illustrating an angular speed sensor X2 according to a second embodiment of the present invention. The angular speed sensor X2 includes a supporting substrate S1, oscillating portions 10, 20, driving electrodes 11, 12, 13, 14, 21, 22, 23, 24, monitor electrodes 15, 16, 25, 26, detecting electrodes 17, 18, 27, 28, a pair of coupling beams 40, a plurality of fixing posts 50A, and link portions 60A, 70A. The angular speed sensor X2 differs from the above-described angular speed sensor X1 in that it includes fixing posts 50A instead of the fixing posts 50, and link portions 60A, 70A instead of the link portions 60, 70. The remaining portions of the angular speed sensor X2 may be the same as those of the angular speed sensor X1. In FIG. 12, the link portions 60A, 70A located with a spacing from the supporting substrate S1 are hatched, and other portions spaced from the supporting substrate S1 other than the link portions 60A, 70A are solidly filled, for the sake of explicitness of the drawing.

The fixing posts 50A of the angular speed sensor X2 are provided upright on the supporting substrate S1 and each connected to the relevant coupling beam 40 so as to surround a fixed point 41 of the coupling beam 40. The position on the coupling beam 40 where the fixing post 50A of the angular speed sensor X2 is connected thereto is a local region including the fixed point 41 of the standing wave oscillation of the coupling beam 40.

The link portion 60A serves for communication between the oscillating portion 10, the driving electrodes 12, 14, and the coupling beam 40, and is connected thereto. The link portion 60A also includes a pair of beams 62 extending in the Y-axis direction. The beams 62 each serve as a bridge between the pair of coupling beams 40 as illustrated in FIG. 4. The beam 62 includes a branched portion 62a formed at an end portion connected to the coupling beam 40. The branched portion 62a is of a bent shape, and is connected to the coupling beam 40 at two positions thereof on the respective sides of the fixed point 41 of the standing wave oscillation (the branched portion 62a may be connected to the coupling beam 40 at three or more positions on either of the sides of the fixed point 41 of the standing wave oscillation. This also applies to other branched portions to be subsequently referred to). The branched portion 62a is not connected to the fixing post 50A.

The link portion 70A serves for communication between the oscillating portion 20, the driving electrodes 22, 24, and the coupling beam 40, and is connected thereto. The link portion 70A also includes a pair of beams 72 extending in the Y-axis direction. The beams 72 each serve as a bridge between the pair of coupling beams 40. The beam 72 includes a branched portion 72a formed at an end portion connected to the coupling beam 40. The branched portion 72a is of a bent shape, and is connected to the coupling beam 40 at two positions thereof on the respective sides of the fixed point 41 of the standing wave oscillation. The branched portion 72a is not connected to the fixing post 50A.

When the angular speed sensor X2 is driven, the oscillating portions 10, 20 produce the reference oscillation in the X-axis direction in opposite phases. The reference oscillation may be attained, for example, by applying a predetermined bias voltage to the oscillating portions 10, 20 and the driving electrodes 12, 14, 22, 24, and applying under such state a sine wave voltage (driving voltage) to the driving electrodes 11, 23 while applying the sine wave voltage (driving voltage) of opposite phases (phase difference of 180°) to the driving electrodes 13, 21.

When the angular speed sensor X2 is driven, the pair of coupling beams 40 connected to the oscillating portions 10, 20 and the driving electrodes 12, 14, 22, 24 through the link portions 60A, 70A produce the standing wave oscillation in linkage with the reference oscillation of the oscillating portions 10, 20. This is because the link portions 60A, 70A that transmit the driving force for the reference oscillation to the oscillating portions 10, 20 are connected to the region to include the fixed point 41 of the standing wave oscillation of the respective coupling beams 40, so that when the angular speed sensor X2 is driven the relevant connection terminal of the link portions 60A, 70A generates a torque for generating the standing wave oscillation (torque about the fixed point 41) at the fixed point of each coupling beam 40. The standing wave oscillation of the coupling beam 40 allows the respective reference oscillation of the oscillating portions 10, 20 to be coupled in opposite phases.

When the angular speed sensor X2 is driven, further, the monitor electrodes 15, 16, 25, 26 serve to maintain the resonance of the movable portion in such oscillation mode that the oscillating portions 10, 20 produce the reference oscillation in opposite phases, as described regarding the driving state of the angular speed sensor X1.

Once an angular speed about the Z-axis illustrated in FIG. 12 is exerted to the angular speed sensor X2, and hence to the oscillating portions 10, 20 while the oscillating portions 10, 20 are producing the reference oscillation in opposite phases as above, a Coriolis force is periodically generated so as to displace the oscillating portions 10, 20 in the Y-axis direction. Accordingly, the oscillating portions 10, 20 each produce the Coriolis oscillation in the Y-axis direction in opposite phases, to thereby incur fluctuation of the static capacitance between the oscillating portion 10 and the detecting electrodes 17, 18, as well as between the oscillating portion 20 and the detecting electrodes 27, 28. Then the displacement amount, in other words the amplitude of oscillation of the oscillating portions 10, 20 is detected based on the fluctuation of the static capacitance, so that the angular speed exerted to the angular speed sensor X2, and hence to the oscillating portions 10, 20 is led out according to the detection result, in a circuit not illustrated.

The configuration that the respective link portions 60A, 70A are connected via the branched portions 62a, 72a to the coupling beam 40 at two positions thereof on the respective sides of the fixed point of the standing wave oscillation of each coupling beam 40 facilitates, upon driving the angular speed sensor X2, increasing the torque for the standing wave oscillation (torque about the fixed point 41) generated by the connection terminal (branched portion 62a, 72a) of each link portion 60A, 70A at the respective local region of each coupling beam 40. Consequently, the angular speed sensor X2 facilitates achieving high-efficiency coupling of the respective reference oscillation of the pair of oscillating portions 10, 20.

The angular speed sensor X2 is also appropriate for suppressing leakage of the driving energy that drives the oscillating portions 10, 20 to produce the reference oscillation, to the supporting substrate S1. Whereas the movable portion of the angular speed sensor X2, including the oscillating portions 10, 20 and the coupling beam 40, is fixed to the supporting substrate S1 via the plurality of fixing posts 50A, it is the fixed point of the standing wave oscillation of the coupling beam 40 that the fixing posts 50A are directly connected to the movable portion of the angular speed sensor X2. Such configuration suppresses the leakage to the supporting substrate S1 through the fixing post 50A, of the driving force or driving energy, generated between the driving electrodes 11 and 12 and between the driving electrodes 13 and 14 and transmitted though the link portion 60A, for driving the oscillating portion 10 to produce the reference oscillation, also generated between the driving electrodes 21 and 22 and between the driving electrodes 23 and 24 and transmitted though the link portion 70A, for driving the oscillating portion 20 to produce the reference oscillation.

Thus, the angular speed sensor X2 is appropriate for coupling the respective reference oscillation of the oscillating portions 10, 20 with high efficiency, and suppressing leakage of the driving energy for generating the reference oscillation to the supporting substrate S1.

Figure 13:
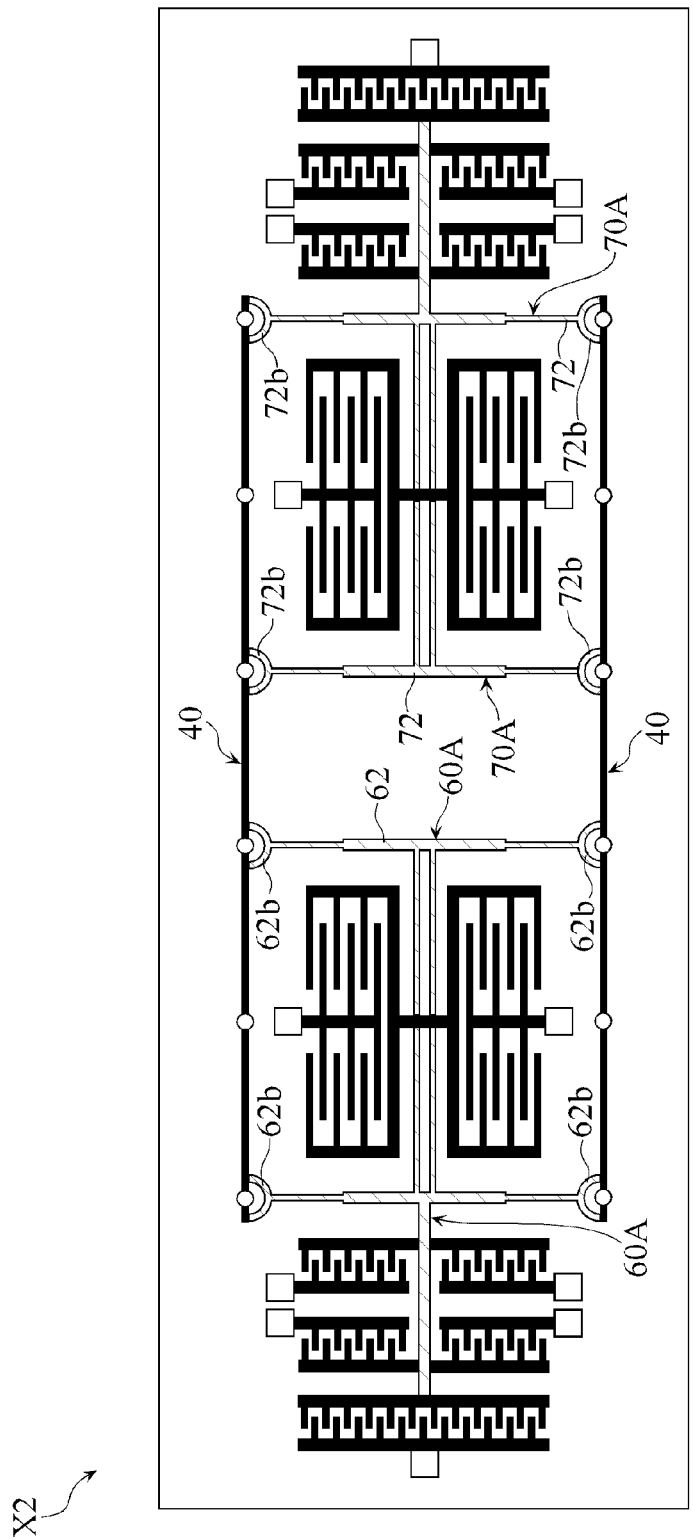
FIG. 13 is a plan view illustrating a variation of the angular speed sensor of FIG. 12.

FIG. 13 depicts a variation of the angular speed sensor X2. The angular speed sensor X2 may include branched portions 62b, 72b at the end portions of the beams 61, 71 of the link portions 60A, 70A instead of the branched portion 62a, 72a, respectively. The branched portions 62b, 72b are of a curved shape as illustrated in FIG. 13. Such configuration of the branched portions 62b, 72b increases the force transmission efficiency at the end portions of the beams 62, 72, thereby contributing to improve the generation efficiency of the torque for the standing wave oscillation of the coupling beam 40 in the driving stage.

Figure 14:
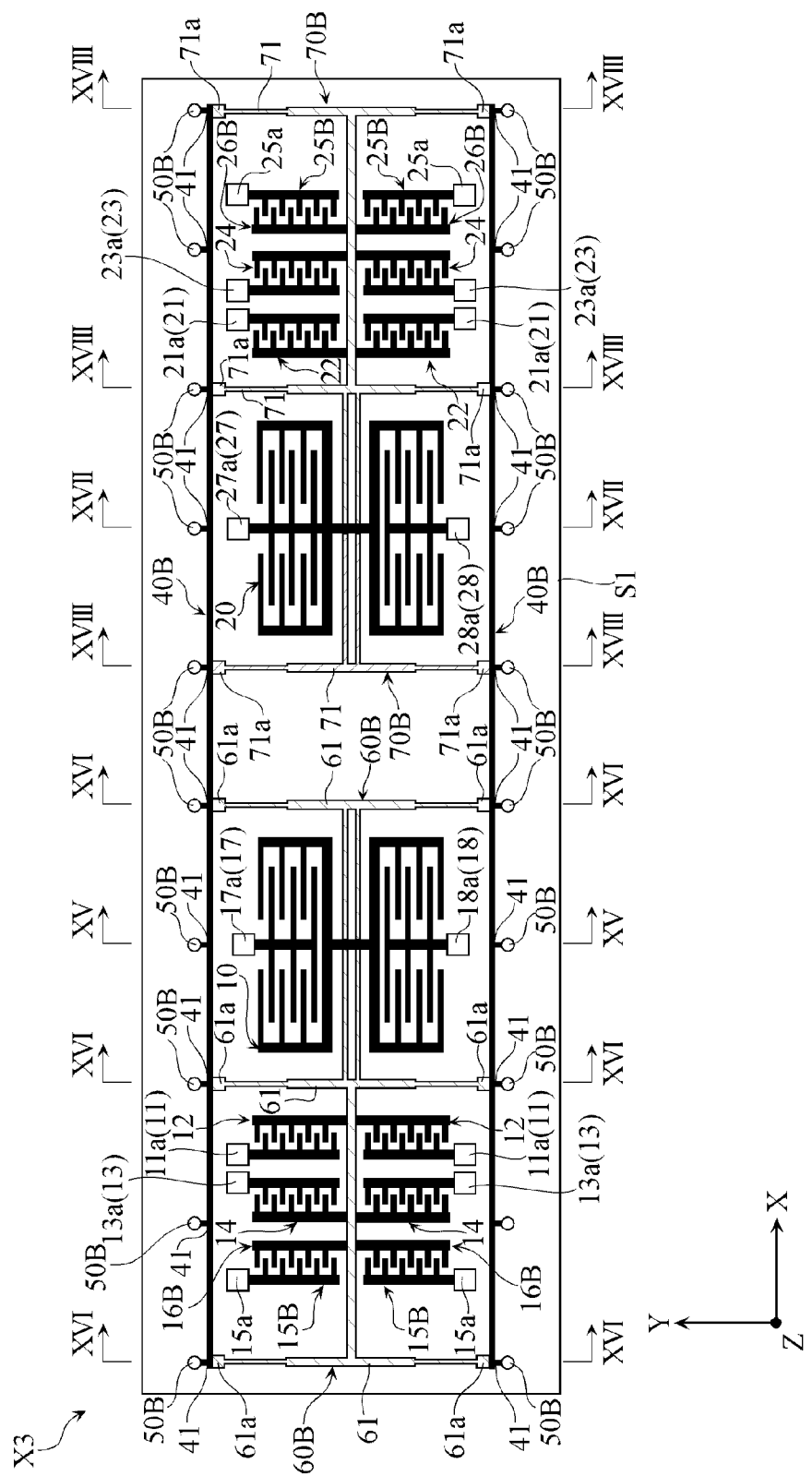
FIG. 14 is a plan view illustrating an angular speed sensor according to a third embodiment of the present invention.
Figure 15:
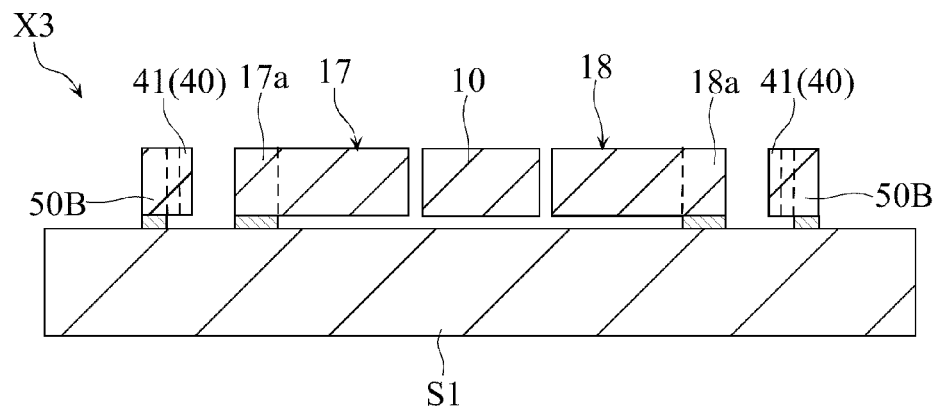
FIG. 15 is an enlarged cross-sectional view taken along a line XV-XV in FIG. 14.
Figure 16:
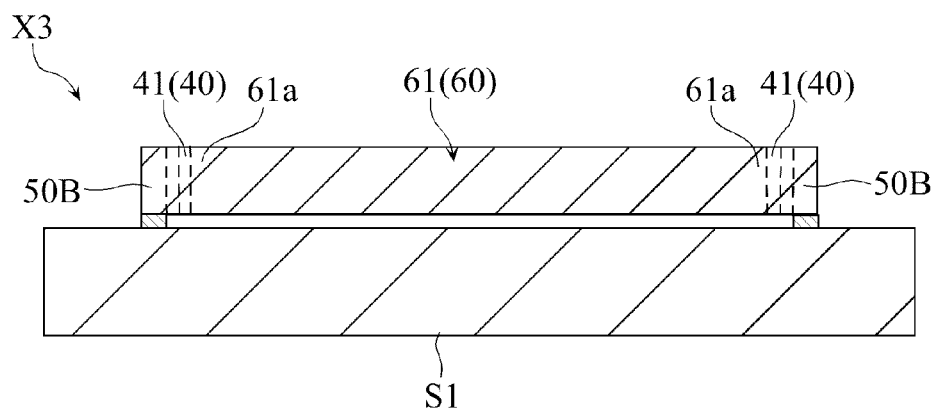
FIG. 16 is an enlarged cross-sectional view taken along a line XVI-XVI in FIG. 14.
Figure 17:
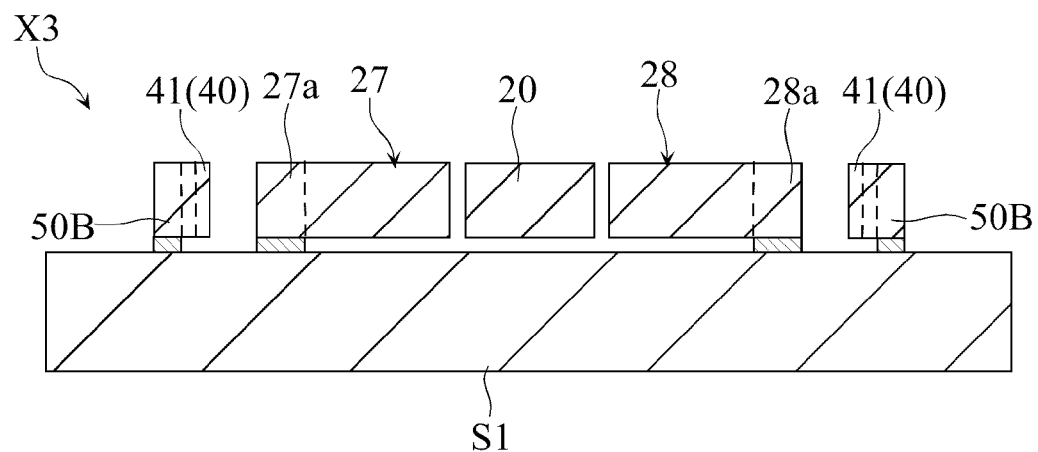
FIG. 17 is an enlarged cross-sectional view taken along a line XVII-XVII in FIG. 14.
Figure 18:
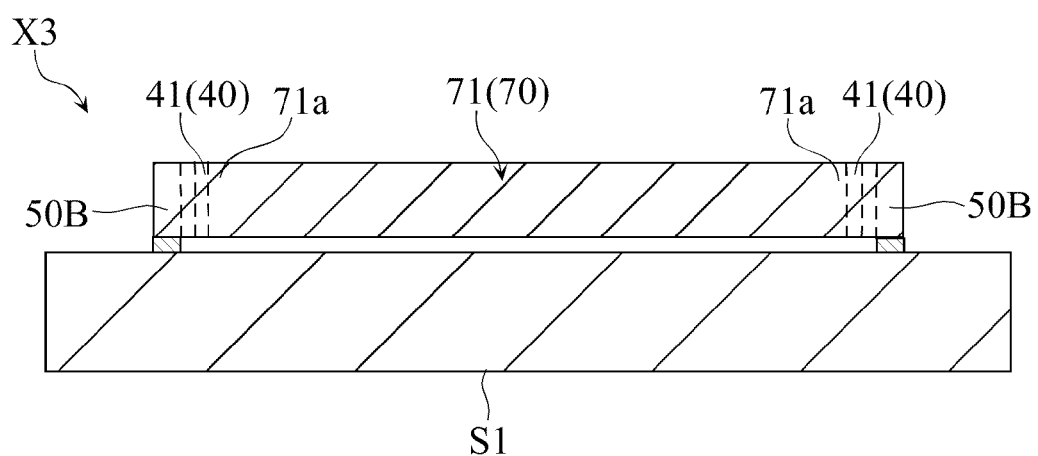
FIG. 18 is an enlarged cross-sectional view taken along a line XVIII-XVIII in FIG. 14.

FIGS. 14 to 18 depict an angular speed sensor X3 according to a third embodiment of the present invention. FIG. 14 is a plan view of the angular speed sensor X3. FIGS. 15 to 18 are enlarged cross-sectional views taken along lines XV-XV, XVI-XVI, VII-XVII, and XVIII-XVIII in FIG. 14.

The angular speed sensor X3 includes the supporting substrate S1, the oscillating portions 10, 20, the driving electrodes 11, 12, 13, 14, 21, 22, 23, 24, the monitor electrodes 15B, 16B, 25B, 26B, the detecting electrodes 17, 18, 27, 28, the pair of coupling beams 40B, a plurality of fixing posts 50B, and link portions 60B, 70B. The angular speed sensor X3 is different from the angular speed sensor X1 in including the monitor electrodes 15B, 16B, 25B, 26B instead of the monitor electrodes 15, 16, 25, 26, fixing posts 50B instead of the fixing posts 50, and the link portions 60B, 70B instead of the link portions 60, 70. The remaining portions of the angular speed sensor X3 are the same as those of the angular speed sensor X1. In FIG. 14, the link portions 60B, 70B located with a spacing from the supporting substrate S1 are hatched, and other portions spaced from the supporting substrate S1 other than the link portions 60B, 70B are solidly filled, for the sake of explicitness of the drawing.

The monitor electrode 15B has a comb electrode structure including a plurality of electrode fingers, and includes an electrode pad 15a. The electrode pad 15a is fixed to the supporting substrate S1. The monitor electrode 15B is a fixed monitor electrode. The monitor electrode 16B has a comb electrode structure including a plurality of electrode fingers, and extends from the link portion 60B. The monitor electrode 16B is a movable monitor electrode. The monitor electrodes 15B, 16B constitute a detector that detects a displacement amount of the oscillating portion 10 in the X-axis direction based on fluctuation of static capacitance.

The monitor electrode 25B has a comb electrode structure including a plurality of electrode fingers, and includes an electrode pad 25a. The electrode pad 25a is fixed to the supporting substrate S1. The monitor electrode 25B is a fixed monitor electrode. The monitor electrode 26B has a comb electrode structure including a plurality of electrode fingers, and extends from the link portion 70B. The monitor electrode 26B is a movable monitor electrode. The monitor electrodes 25B, 26B constitute a detector that detects a displacement amount of the oscillating portion 20 in the X-axis direction.

The pair of coupling beams 40B serves to couple the respective reference oscillation of the oscillating portions 10, 20 in the X-axis direction such that the reference oscillation is produced in opposite phases, and each extends in the X-axis direction and is spaced from each other in the Y-axis direction. The oscillating portions 10, 20, the driving electrodes 11 to 14, 21 to 24, and the monitor electrodes 15B, 16B, 25B, 26B are located between the pair of coupling beams 40B. Also, the coupling beam 40B is capable of producing the standing wave oscillation.

The plurality of fixing posts 50B each serve to fix the relevant coupling beam 40B to the supporting substrate S1, and are provided upright on the supporting substrate S1 to be connected to the coupling beam 40B, as illustrated in FIGS. 15 to 18. The position on the coupling beam 40B where the fixing post 50B is connected thereto is the fixed point (local region including the fixed point 41) of the standing wave oscillation of the coupling beam 40B. In this embodiment, the fixing posts 50B are connected to the coupling beam 40B at the positions dividing the coupling beam 40B equally in nine segments in the longitudinal direction, and each fixing post 50B is connected to the side of the coupling beam 40B opposite to the oscillating portions 10, 20.

The link portion 60B serves for communication between the oscillating portion 10, the driving electrodes 12, 14, the monitor electrode 16B, and the coupling beam 40B, and is connected thereto. The link portion 60B also includes three beams 61 extending in the Y-axis direction. The beams 61 each serve as a bridge between the pair of coupling beams 40B. The beam 61 includes a widened portion 61a formed at an end portion connected to the coupling beam 40B. The connection point of the widened portion 61a and the coupling beam 40B is the fixed point (local region including the fixed point 41) of the standing wave oscillation of the coupling beam 40B. The widened portion 61a formed on the beam 61 extending in the Y-axis direction has a uniform width.

The link portion 70B serves for communication between the oscillating portion 20, the driving electrodes 22, 24, the monitor electrode 26B, and the coupling beam 40B, and is connected thereto. The link portion 70B also includes three beams 71 extending in the Y-axis direction. The beams 71 each serve as a bridge between the pair of coupling beams 40B. The beam 71 includes a widened portion 71a formed at an end portion connected to the coupling beam 40B. The connection point of the widened portion 71a and the coupling beam 40B is the fixed point (local region including the fixed point 41) of the standing wave oscillation of the coupling beam 40B.

Figure 19:
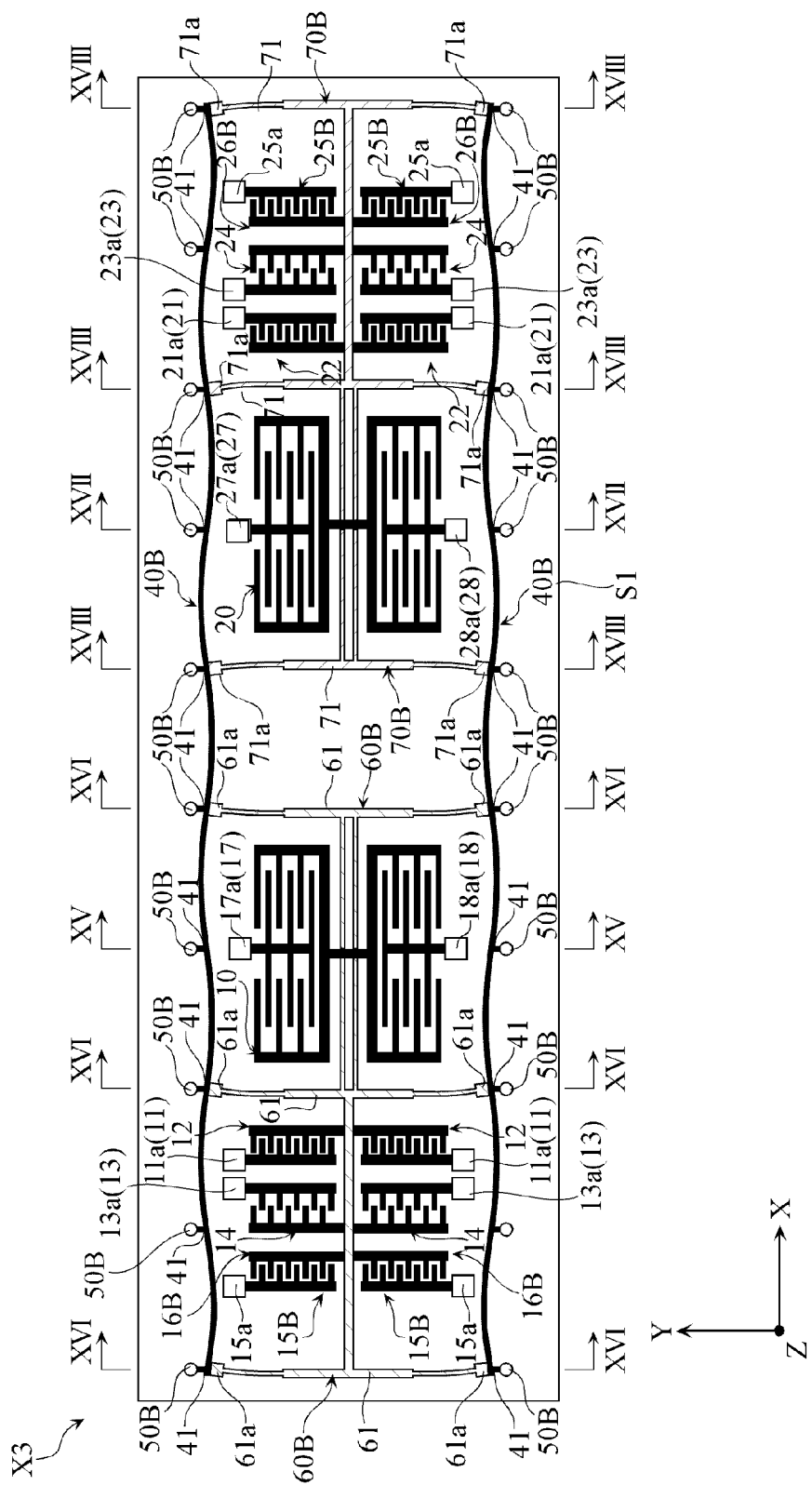
FIG. 19 is a plan view illustrating the angular speed sensor of FIG. 14 being driven.
Figure 20:
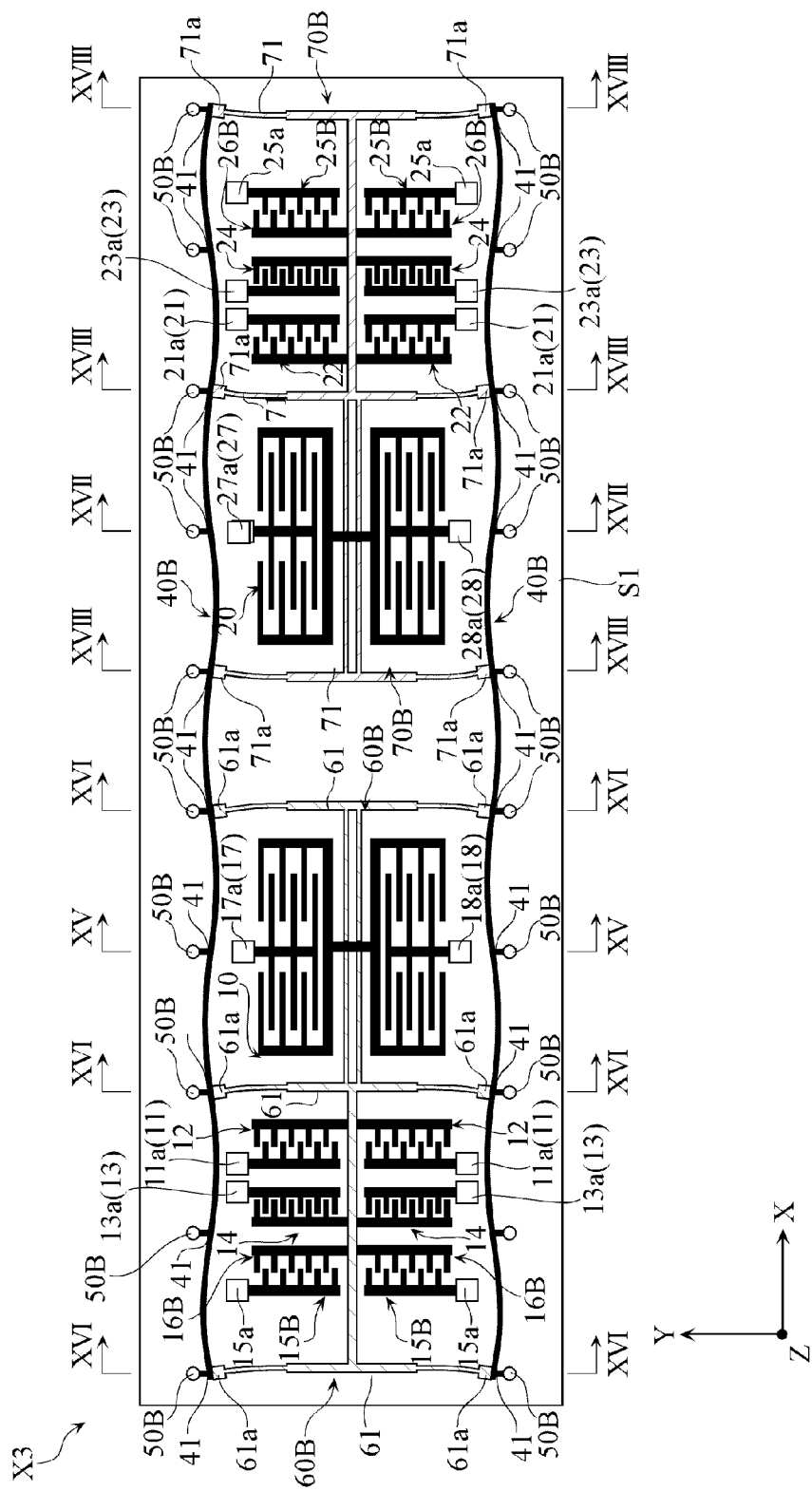
FIG. 20 is another plan view illustrating the angular speed sensor of FIG. 14 being driven.

When the angular speed sensor X3 is driven, the oscillating portions 10, 20 produce the reference oscillation in the X-axis direction in opposite phases, as illustrated in FIGS. 19 and 20. The reference oscillation may be attained, for example, by applying a predetermined bias voltage to the oscillating portions 10, 20 and the driving electrodes 12, 14, 22, 24, and applying under such state a sine wave voltage (driving voltage) to the driving electrodes 11, 23 while applying the sine wave voltage (driving voltage) of opposite phases (phase difference of 180°) to the driving electrodes 13, 21.

When the angular speed sensor X3 is driven, the pair of coupling beams 40B connected to the oscillating portions 10, 20, the driving electrodes 12, 14, 22, 24, and the monitor electrodes 16B, 26B through the link portions 60B, 70B produce the standing wave oscillation in linkage with the reference oscillation of the oscillating portions 10, 20. This is because the link portions 60B, 70B that transmit the driving force for the reference oscillation to the oscillating portions 10, 20 are connected to the region to include the fixed point 41 of the standing wave oscillation of the respective coupling beams 40B, so that when the angular speed sensor X3 is driven the relevant connection terminal of the link portions 60B, 70B generates a torque for generating the standing wave oscillation (torque about the fixed point 41) at the fixed point of each coupling beam 40B. The standing wave oscillation of the coupling beam 40B allows the respective reference oscillation of the oscillating portions 10, 20 to be coupled in opposite phases.

When the angular speed sensor X3 is driven, further, the monitor electrodes 15B, 16B, 25B, 26B serve to maintain the resonance of the movable portion in such oscillation mode that the oscillating portions 10, 20 produce the reference oscillation in opposite phases. The specific details are as described regarding the monitor electrode 15, 16, 25, 26 of the angular speed sensor X1.

Figure 21:
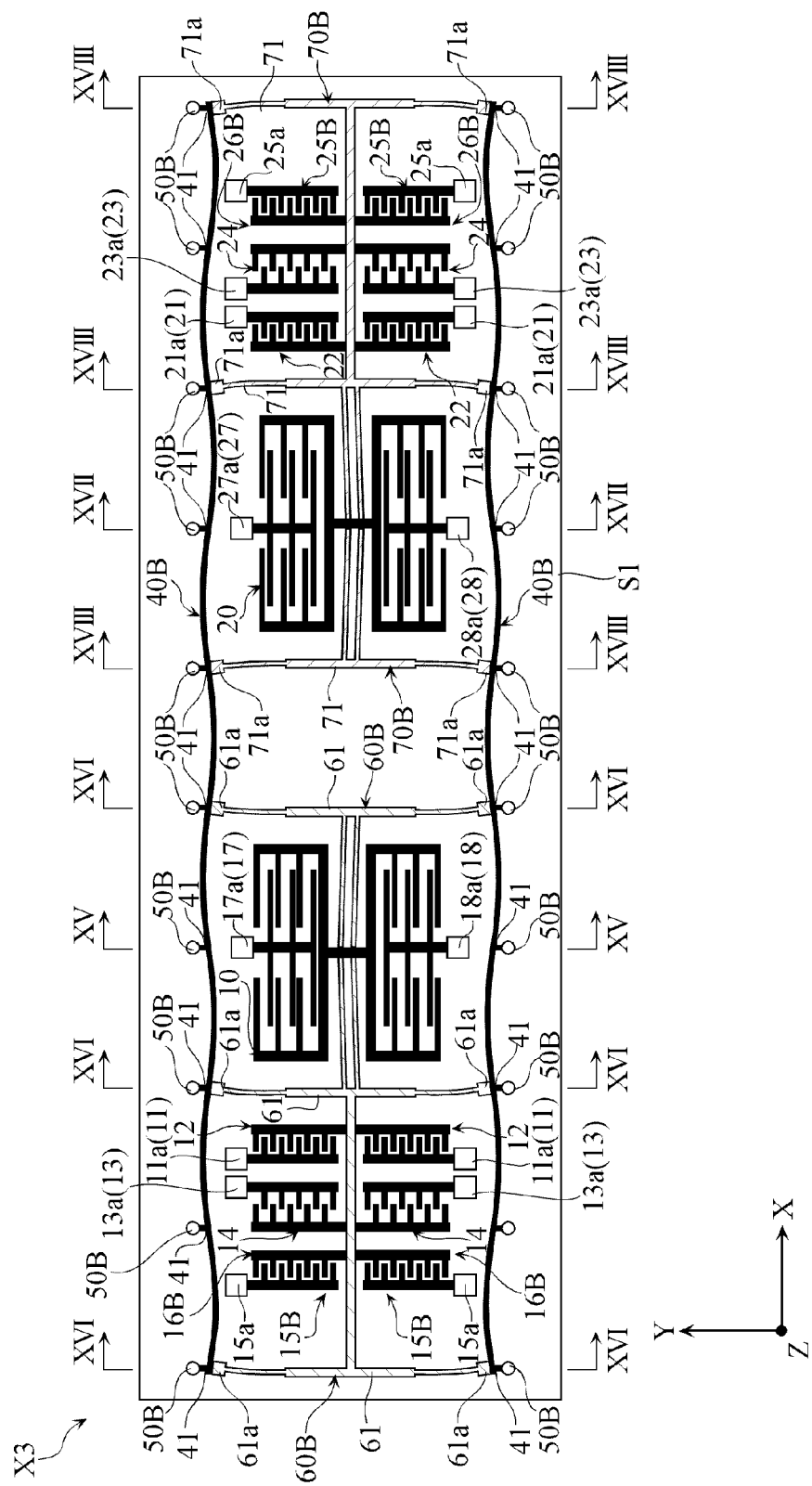
FIG. 21 is a plan view illustrating the angular speed sensor of FIG. 14 being driven, with an angular speed exerted thereto.

Once an angular speed about the Z-axis illustrated in FIG. 14 is exerted to the angular speed sensor X3, and hence to the oscillating portions 10, 20 while the oscillating portions 10, 20 are producing the reference oscillation in opposite phases as above, a Coriolis force is periodically generated so as to displace the oscillating portions 10, 20 in the Y-axis direction. Accordingly, the oscillating portions 10, 20 each produce the Coriolis oscillation in the Y-axis direction in opposite phases, to thereby incur fluctuation of the static capacitance between the oscillating portion 10 and the detecting electrodes 17, 18, as well as between the oscillating portion 20 and the detecting electrodes 27, 28, for example as illustrated in FIG. 21. Then the displacement amount, in other words the amplitude of oscillation of the oscillating portions 10, 20 is detected based on the fluctuation of the static capacitance, so that the angular speed exerted to the angular speed sensor X3, and hence to the oscillating portions 10, 20 is led out according to the detection result, in a circuit not illustrated.

The configuration that the respective link portions 60B, 70B are connected via the widened portions 61a, 71a to the fixed point of the standing wave oscillation of each coupling beam 40B facilitates, upon driving the angular speed sensor X3, increasing the torque for the standing wave oscillation (torque about the fixed point 41) generated by the connection terminal (widened portion 61a, 71a) of each link portion 60B, 70B at the fixed point of the standing wave oscillation of each coupling beam 40B. Consequently, the angular speed sensor X3 facilitates achieving high-efficiency coupling of the respective reference oscillation of the pair of oscillating portions 10, 20.

The angular speed sensor X3 is also appropriate for suppressing leakage of the driving energy that drives the oscillating portions 10, 20 to produce the reference oscillation, to the supporting substrate S1. Whereas the movable portion of the angular speed sensor X3, including the oscillating portions 10, 20 and the coupling beam 40B, is fixed to the supporting substrate S1 via the plurality of fixing posts 50B, it is the fixed point of the standing wave oscillation of the coupling beam 40B that the fixing posts 50B are directly connected to the movable portion of the angular speed sensor X3. Such configuration suppresses the leakage to the supporting substrate S1 through the fixing post 50B, of the driving force or driving energy, generated between the driving electrodes 11 and 12 and between the driving electrodes 13 and 14 and transmitted though the link portion 60B, for driving the oscillating portion 10 to produce the reference oscillation, also generated between the driving electrodes 21 and 22 and between the driving electrodes 23 and 24 and transmitted though the link portion 70B, for driving the oscillating portion 20 to produce the reference oscillation.

Thus, the angular speed sensor X3 is appropriate for coupling the respective reference oscillation of the oscillating portions 10, 20 with high efficiency, and suppressing leakage of the driving energy for generating the reference oscillation to the supporting substrate S1.

Further, in the angular speed sensor X3, the driving electrodes 12, 14 (movable driving electrodes) and the monitor electrode 16B (movable monitor electrode) are located between the pair of coupling beams 40B spaced in the Y-axis direction, and the link portion 60B includes the beam 61 serving as a bridge between the pair of coupling beams 40B on the opposite side of the oscillating portion 10 with respect to the movable electrodes, and connected to the movable electrodes. Likewise, the driving electrodes 22, 24 (movable driving electrode) and the monitor electrode 26B (movable monitor electrode) are located between the pair of coupling beams 40B spaced in the Y-axis direction, and the link portion 70B includes the beam 71 serving as a bridge between the pair of coupling beams 40B on the opposite side of the oscillating portion 20 with respect to the movable electrodes, and connected to the movable electrodes. Such structure of the angular speed sensor X3 is advantageous for preventing the driving electrodes 12, 14, 22, 24 and the monitor electrodes 16B, 26B from being unduly displaced in the Y-axis direction, when the angular speed sensor X3 is driven.

Figure 22:
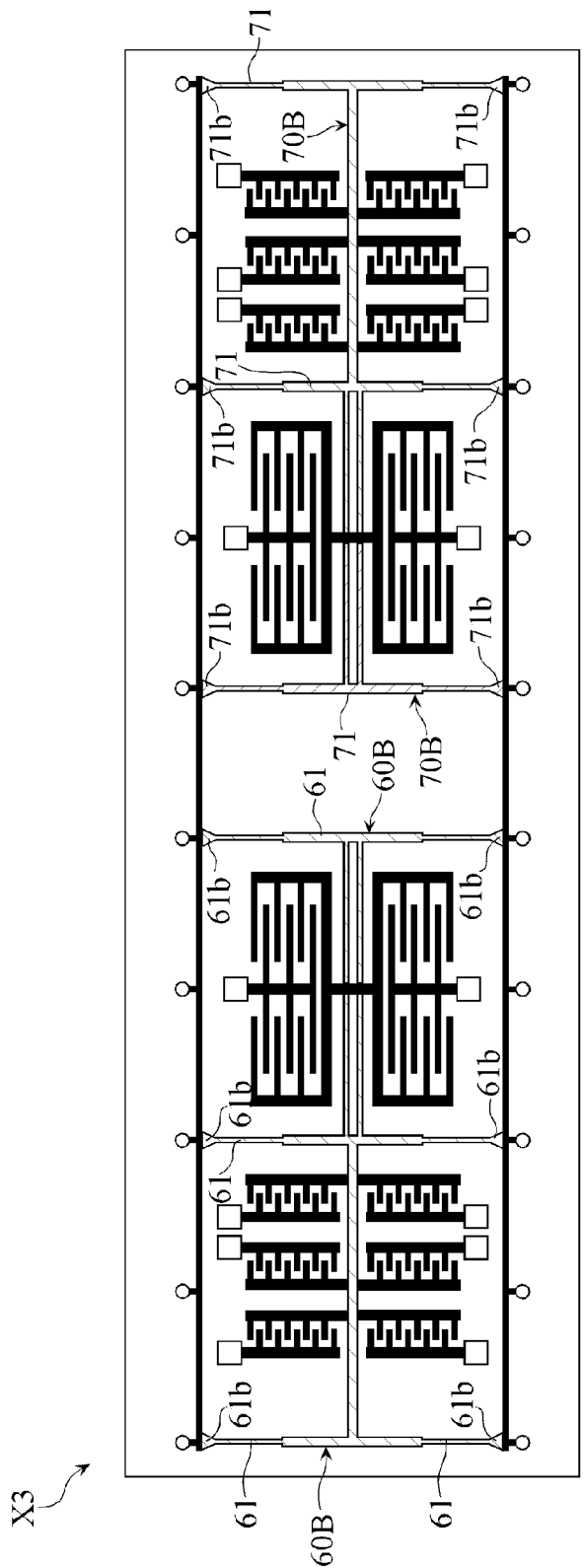
FIG. 22 is a plan view illustrating a variation of the angular speed sensor of FIG. 14.

FIG. 22 depicts a variation of the angular speed sensor X3. The angular speed sensor X3 may include widened portions 61b, 71b at the end portions of the beams 61, 71 of the link portions 60B, 70B, instead of the widened portions 61a, 71a respectively. The widened portions 61b, 71b have a gradually widening shape toward the coupling beam 40B in a plan view as illustrated in FIG. 22. Such configuration alleviates concentration of deformation stress generated at the end portion of the beams 61, 71 in a driving (oscillating) stage.

Figure 23:
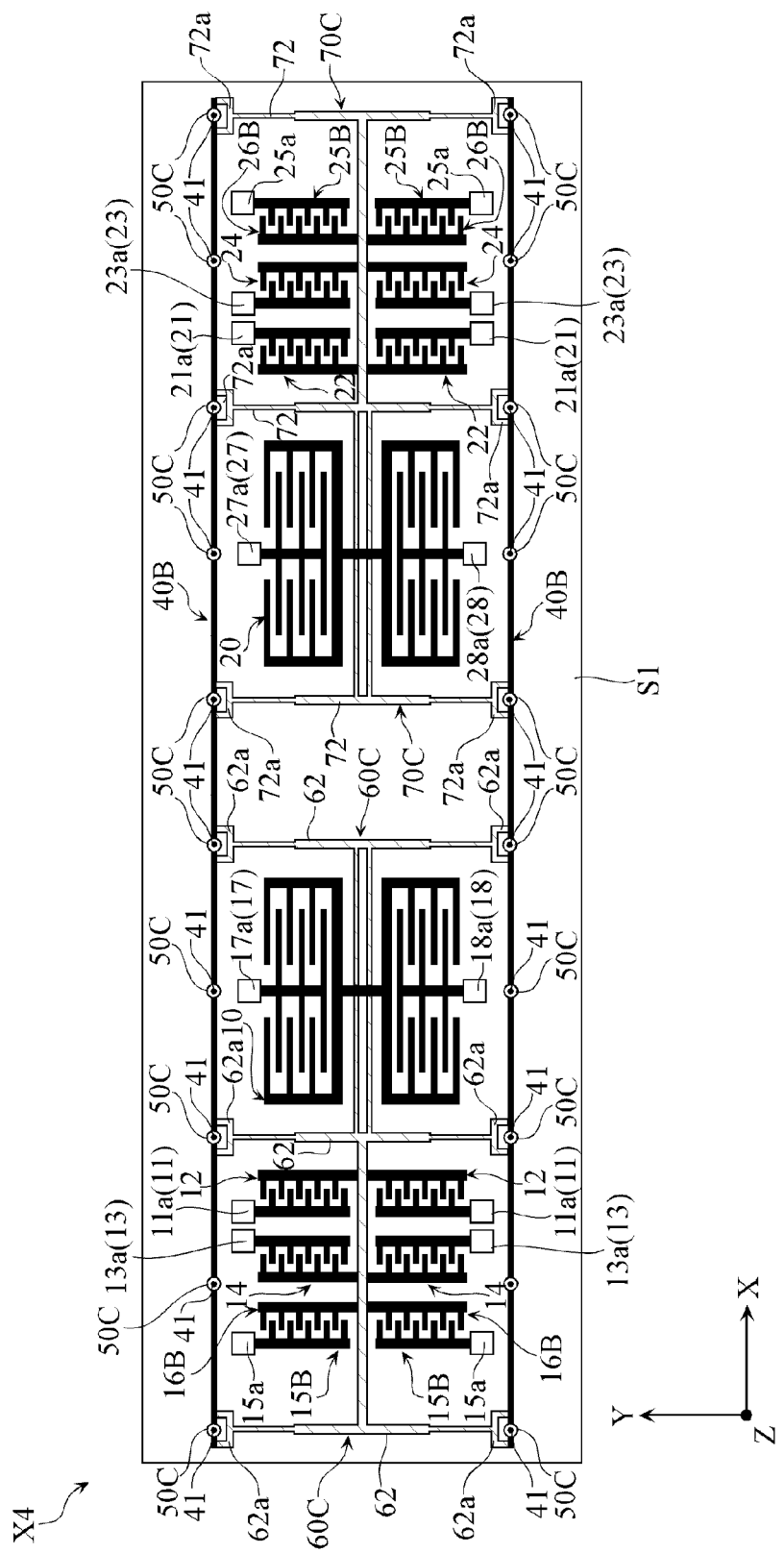
FIG. 23 is a plan view illustrating an angular speed sensor according to a fourth embodiment of the present invention.

FIG. 23 is a plan view illustrating an angular speed sensor according to a fourth embodiment of the present invention. The angular speed sensor X4 includes the supporting substrate S1, the oscillating portions 10, 20, the driving electrodes 11, 12, 13, 14, 21, 22, 23, 24, the monitor electrodes 15B, 16B, 25B, 26B, the detecting electrodes 17, 18, 27, 28, the pair of coupling beams 40B, a plurality of fixing posts 50C, and link portions 60C, 70C. The angular speed sensor X4 is different from the angular speed sensor X3 in including the fixing posts 50C instead of the fixing posts 50B, and the link portion 60C, 70C instead of the link portions 60B, 70B. The remaining portions of the angular speed sensor X4 are the same as those of the angular speed sensor X3. In FIG. 23, the link portions 60C, 70C located with a spacing from the supporting substrate S1 are hatched, and other portions spaced from the supporting substrate S1 other than the link portions 60C, 70C are solidly filled, for the sake of explicitness of the drawing.

The fixing posts 50C of the angular speed sensor X4 are each provided upright on the supporting substrate S1 and connected to the coupling beam 40B so as to surround the fixed point 41 of the coupling beam 40B. The position on the coupling beam 40B where the fixing post 50B of the angular speed sensor X4 is connected thereto is a local region including the fixed point 41 of the standing wave oscillation of the coupling beam 40B.

The ink portion 60C serves for communication between the oscillating portion 10, the driving electrodes 12, 14, the monitor electrode 16B, and the coupling beam 40B, and is connected thereto. The link portion 60C also includes three beams 62 extending in the Y-axis direction. The beams 62 each serve as a bridge between the pair of coupling beams 40B. The beam 62 includes a branched portion 62a formed at an end portion connected to the coupling beam 40B. The branched portion 62a is of a bent shape, and is connected to the coupling beam 40B at two positions thereof on the respective sides of the fixed point 41 of the standing wave oscillation of the coupling beam 40B. The branched portion 62a is not connected to the fixing post 50C.

The link portion 70C serves for communication between the oscillating portion 20, the driving electrodes 22, 24, the monitor electrode 26B, and the coupling beam 40B, and is connected thereto. The link portion 70C also includes three beams 72 extending in the Y-axis direction. The beams 72 each serve as a bridge between the pair of coupling beams 40B. The beam 72 includes a branched portion 72a formed at an end portion connected to the coupling beam 40B. The branched portion 72a is of a bent shape, and is connected to the coupling beam 40B at two positions thereof on the respective sides of the fixed point 41 of the standing wave oscillation of the coupling beam 40B. The branched portion 72a is not connected to the fixing post 50C.

When the angular speed sensor X4 is driven, the oscillating portions 10, 20 produce the reference oscillation in the X-axis direction in opposite phases. The reference oscillation may be attained, for example, by applying a predetermined bias voltage to the oscillating portions 10, 20 and the driving electrodes 12, 14, 22, 24, and applying under such state a sine wave voltage (driving voltage) to the driving electrodes 11, 23 while applying the sine wave voltage (driving voltage) of opposite phases (phase difference of 180°) to the driving electrodes 13, 21.

When the angular speed sensor X4 is driven, the pair of coupling beams 40B connected to the oscillating portions 10, 20, the driving electrodes 12, 14, 22, 24, and the monitor electrodes 16B, 26B through the link portions 60C, 70C produce the standing wave oscillation in linkage with the reference oscillation of the oscillating portions 10, 20. This is because the link portions 60C, 70C that transmit the driving force for the reference oscillation to the oscillating portions 10, 20 are connected to the region to include the fixed point 41 of the standing wave oscillation of the respective coupling beams 40B, so that when the angular speed sensor X4 is driven the relevant connection terminal of the link portions 60C, 70C generates a torque for generating the standing wave oscillation (torque about the fixed point 41) at the fixed point of each coupling beam 40B. The standing wave oscillation of the coupling beam 40B allows the respective reference oscillation of the oscillating portions 10, 20 to be coupled in opposite phases.

When the angular speed sensor X4 is driven, further, the monitor electrodes 15B, 16B, 25B, 26B serve to maintain the resonance of the movable portion in such oscillation mode that the oscillating portions 10, 20 produce the reference oscillation in opposite phases, as described regarding the monitor electrode 15, 16, 25, 26 of the angular speed sensor X1.

Once an angular speed about the Z-axis illustrated in FIG. 23 is exerted to the angular speed sensor X4, and hence to the oscillating portions 10, 20 while the oscillating portions 10, 20 are producing the reference oscillation in opposite phases as above, a Coriolis force is periodically generated so as to displace the oscillating portions 10, 20 in the Y-axis direction. Accordingly, the oscillating portions 10, 20 each produce the Coriolis oscillation in the Y-axis direction in opposite phases, to thereby incur fluctuation of the static capacitance between the oscillating portion 10 and the detecting electrodes 17, 18, as well as between the oscillating portion 20 and the detecting electrodes 27, 28. Then the displacement amount, in other words the amplitude of oscillation of the oscillating portions 10, 20 is detected based on the fluctuation of the static capacitance, so that the angular speed exerted to the angular speed sensor X4, and hence to the oscillating portions 10, 20 is led out according to the detection result, in a circuit not illustrated.

The configuration that the respective link portions 60C, 70C are connected via the branched portions 62a, 72a to the coupling beam 40B at two positions thereof on the respective sides of the fixed point of the standing wave oscillation of each coupling beam 40B facilitates, upon driving the angular speed sensor X4, increasing the torque for the standing wave oscillation (torque about the fixed point 41) generated by the connection terminal (branched portion 62a, 72a) of each link portion 60C, 70C at the respective local region of each coupling beam 40B. Consequently, the angular speed sensor X4 facilitates achieving high-efficiency coupling of the respective reference oscillation of the pair of oscillating portions 10, 20.

The angular speed sensor X4 is also appropriate for suppressing leakage of the driving energy that drives the oscillating portions 10, 20 to produce the reference oscillation, to the supporting substrate S1. Whereas the movable portion of the angular speed sensor X4, including the oscillating portions 10, 20 and the coupling beam 40B, is fixed to the supporting substrate S1 via the plurality of fixing posts 50C, it is the fixed point of the standing wave oscillation of the coupling beam 40B that the fixing posts 50C are directly connected to the movable portion of the angular speed sensor X4. Such configuration suppresses the leakage to the supporting substrate S1 through the fixing post 50C, of the driving force or driving energy, generated between the driving electrodes 11 and 12 and between the driving electrodes 13 and 14 and transmitted though the link portion 60C, for driving the oscillating portion 10 to produce the reference oscillation, also generated between the driving electrodes 21 and 22 and between the driving electrodes 23 and 24 and transmitted though the link portion 70C, for driving the oscillating portion 20 to produce the reference oscillation.

Thus, the angular speed sensor X4 is appropriate for coupling the respective reference oscillation of the oscillating portions 10, 20 with high efficiency, and suppressing leakage of the driving energy for generating the reference oscillation to the supporting substrate S1.

Figure 24:
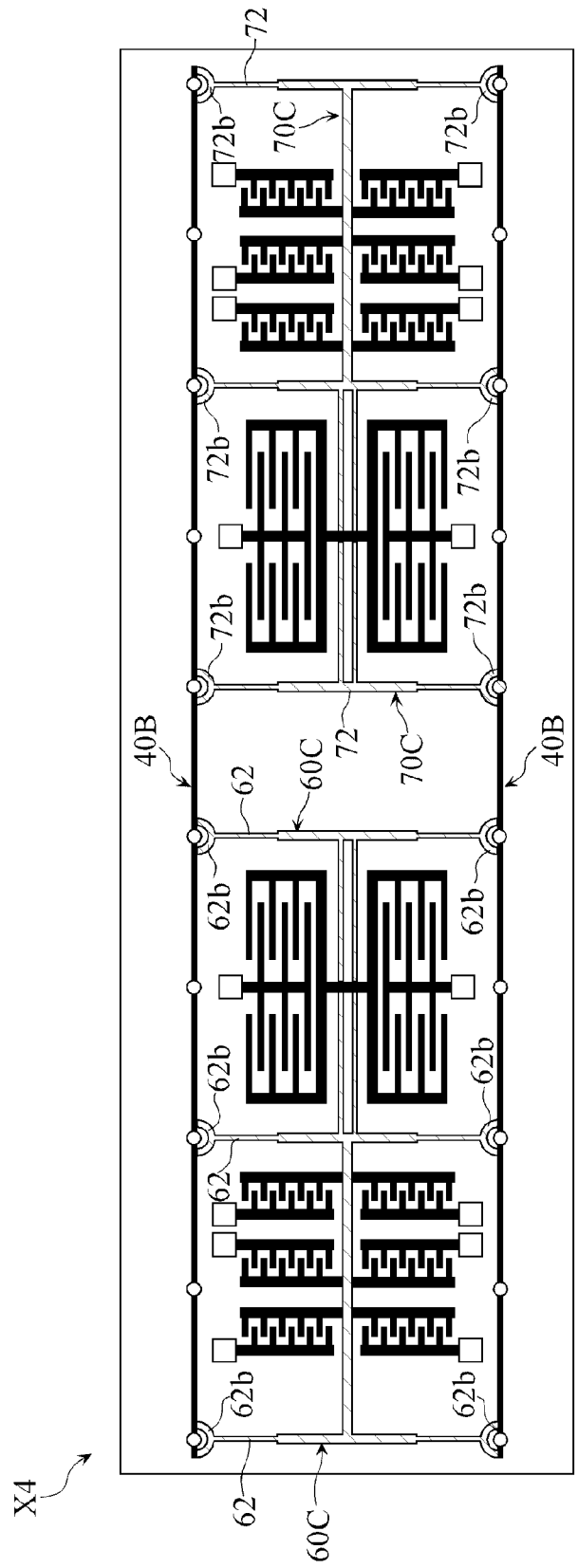
FIG. 24 is a plan view illustrating a variation of the angular speed sensor of FIG. 23.

FIG. 24 depicts a variation of the angular speed sensor X4. The angular speed sensor X2 may include branched portions 62b, 72b at the end portions of the beams 62, 72 of the link portions 60C, 70C instead of the branched portion 62a, 72a, respectively. The branched portions 62b, 72b are of a curved shape as illustrated in FIG. 24. Such configuration of the branched portions 62b, 72b increases the force transmission efficiency at the end portions of the beams 62, 72, thereby contributing to improve the generation efficiency of the torque for the standing wave oscillation of the coupling beam 40B in the driving stage.

Further, in the angular speed sensor X4, the driving electrodes 12, 14 (movable driving electrodes) and the monitor electrode 16B (movable monitor electrode) are located between the pair of coupling beams 40B spaced in the Y-axis direction, and the link portion 60C includes the beam 62 serving as a bridge between the pair of coupling beams 40B on the opposite side of the oscillating portion 10 with respect to the movable electrodes, and connected to the movable electrodes. Likewise, the driving electrodes 22, 24 (movable driving electrode) and the monitor electrode 26B (movable monitor electrode) are located between the pair of coupling beams 40B spaced in the Y-axis direction, and the link portion 70C includes the beam 72 serving as a bridge between the pair of coupling beams 40B on the opposite side of the oscillating portion 20 with respect to the movable electrodes, and connected to the movable electrodes. Such structure of the angular speed sensor X4 is advantageous for preventing the driving electrodes 12, 14, 22, 24 and the monitor electrodes 16B, 26B from being unduly displaced in the Y-axis direction, when the angular speed sensor X4 is driven.

Figure 25:
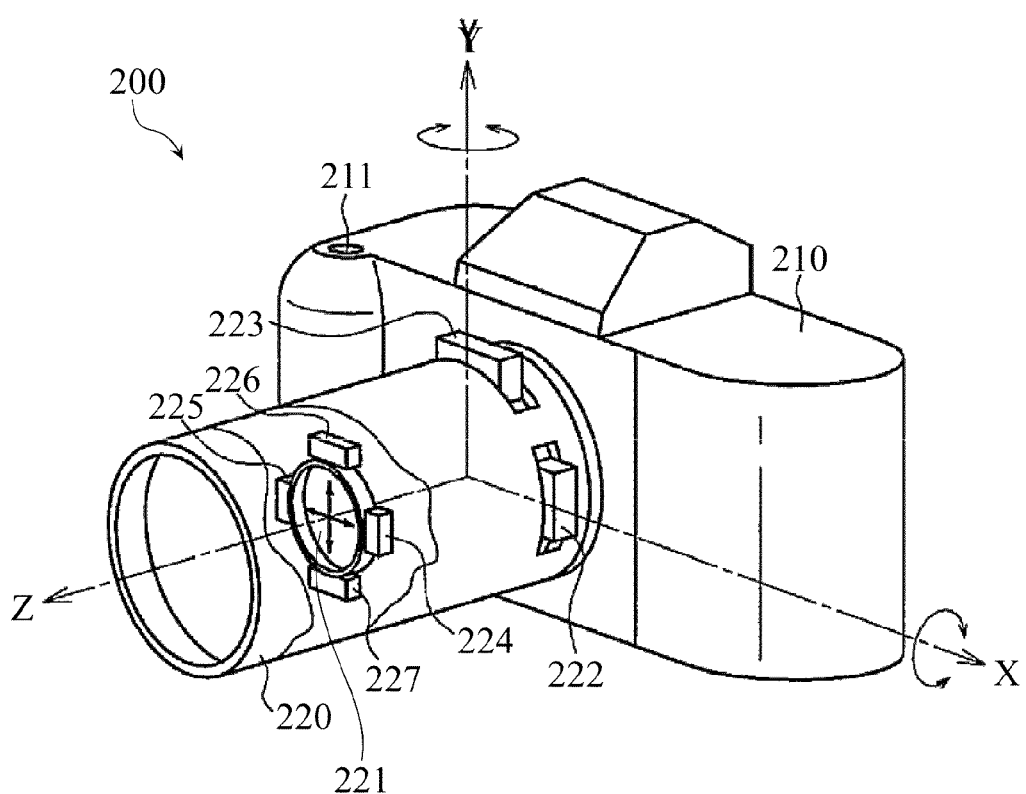
FIG. 25 is a perspective view illustrating a digital camera according to a fifth embodiment of the present invention.
Figure 26:
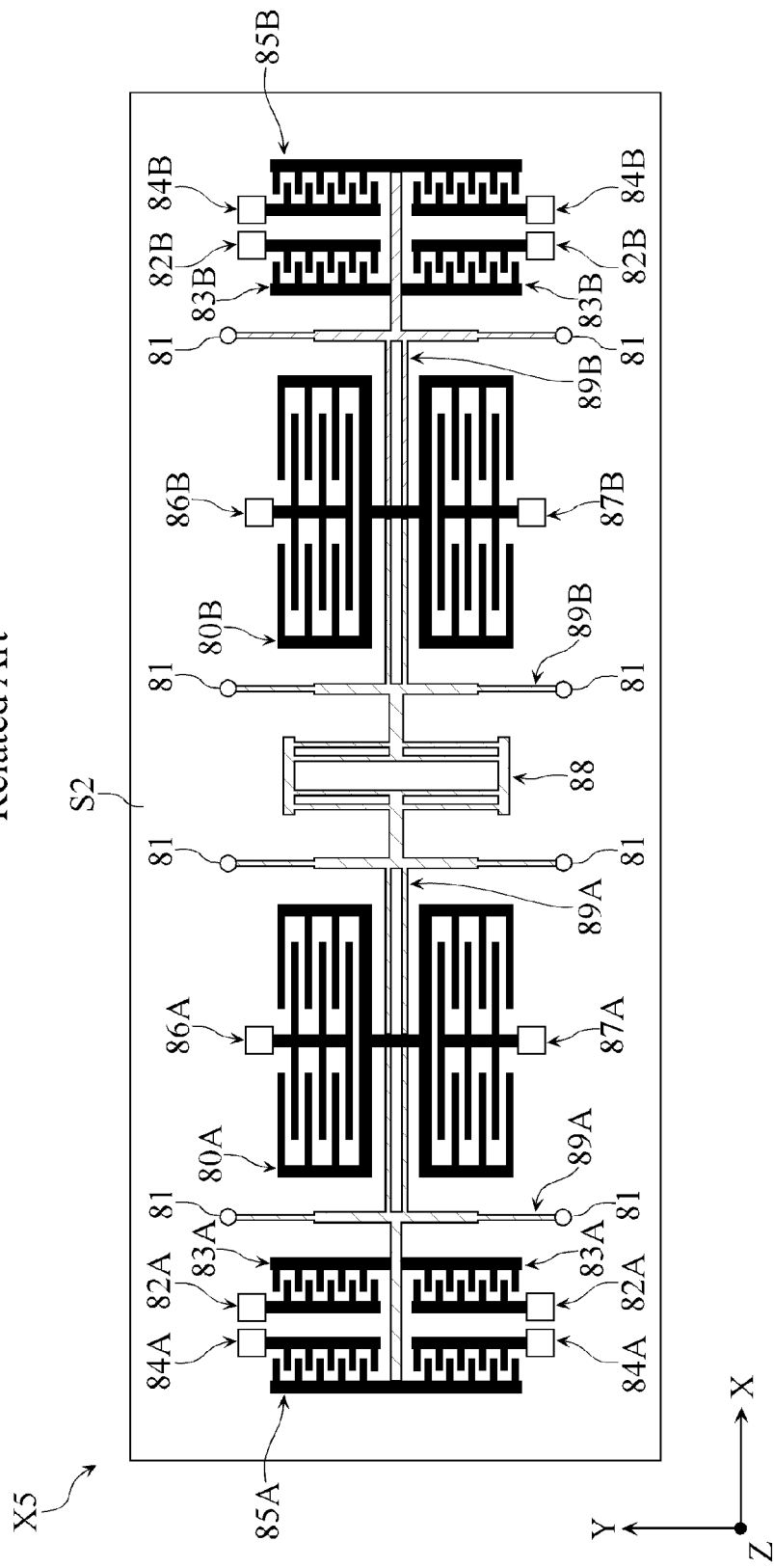
FIG. 26 is a plan view illustrating an angular speed sensor as related art.
Figure 27:
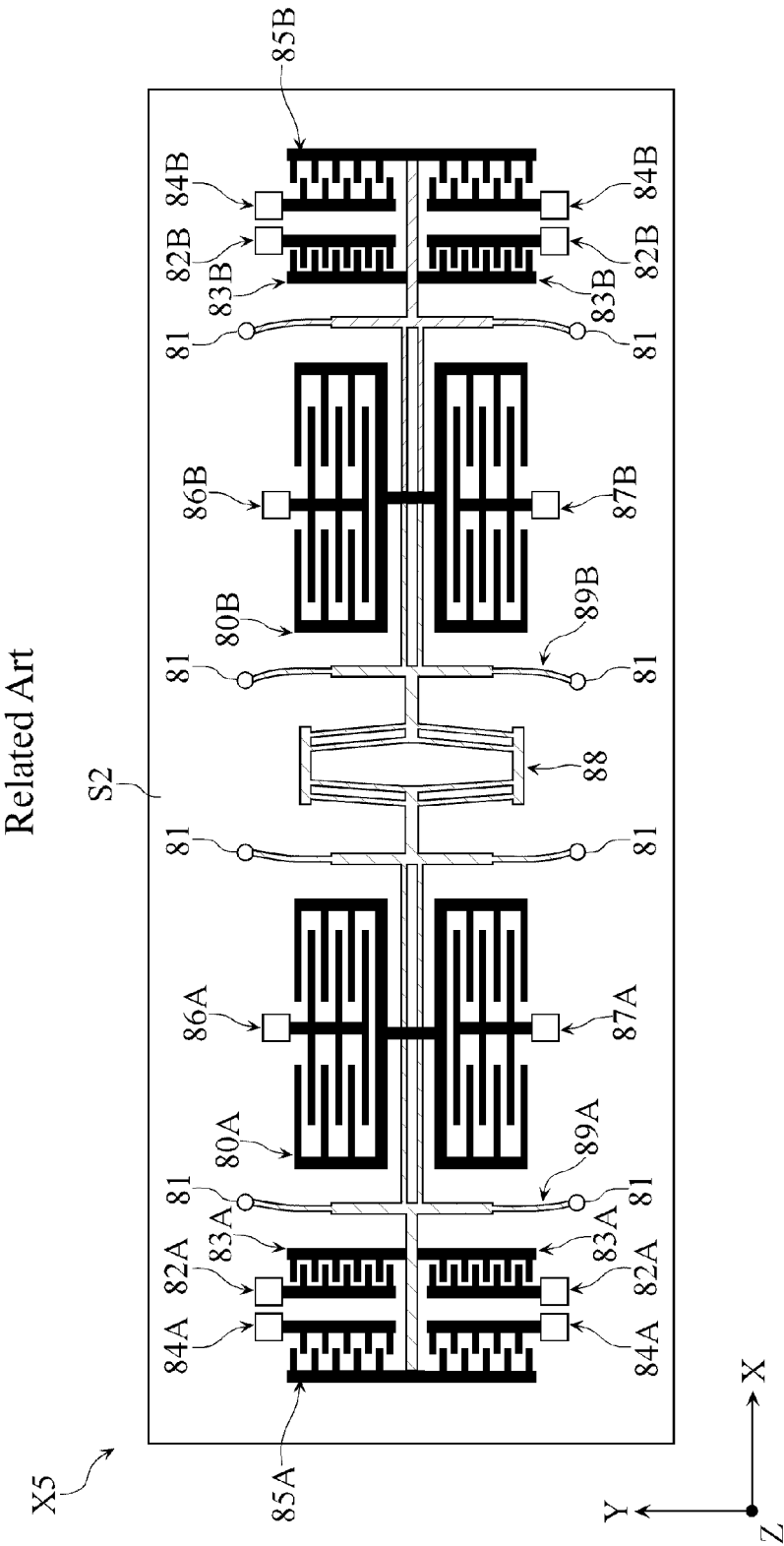
FIG. 27 is a plan view illustrating the angular speed sensor of FIG. 26 in operation.

FIG. 25 illustrates a digital camera 200 according to a fifth embodiment of the present invention. The digital camera 200 includes a camera body 210 and a lens unit 220. The camera body 210 includes a release button 211 to be pressed by the user for photoshooting, and an imaging device (not illustrated) that converts an optical image introduced into the camera body 210 through the lens unit 220 into an electrical signal and outputs such signal. The lens unit 220 includes a focus lens (not illustrated), a zoom lens (not illustrated), a correction lens 221, and a pair of shake sensors 222, 223. The correction lens 221 is mounted so as to be displaced by actuators 224, 225, 226, 227 in a direction perpendicular to the optical axis. The shake sensor 222 serves to detect a shaking motion about the X-axis (pitching) illustrated in FIG. 25. The shake sensor 223 serves to detect a shaking motion about the Y-axis (yawing). The shake sensors 222, 223 are constituted of one of the angular speed sensors X1 to X4.

In case that the digital camera 200 is shaken at the time of shooting an image, the shaking motion of the digital camera 200 is detected by the shake sensor 222, 223 as an angular speed. The detection result obtained by the shake sensors 222, 223 is transmitted to a signal microprocessor (not illustrated). The signal microprocessor calculates the direction and amount of the shaking motion of the digital camera 200 based on the detection result provided by the shake sensor 222, 223, and generates a control signal for cancelling the shaking motion and transmits such control signal to the actuators 224 to 227. The actuators 224 to 227 displace the correction lens 221 by a predetermined amount in a perpendicular direction to the optical axis, based on the control signal. More specifically, the correction lens 221 is displaced in a direction that sets off the shift of the optical axis created by the shaking of the digital camera 200, by the amount corresponding to the shift of the optical axis. That is how the shake correction is performed in the digital camera 200 including the shake sensors 222, 223 (one of the angular speed sensors X1 to X4).

The angular speed sensor X1 to X4 according to the present invention may be applied to cameras other than the digital camera 200, a car navigation system, or a posture control system of a vehicle or a robot. In the case of employing the angular speed sensor X1 to X4 for the car navigation system or the posture control system, the angular speed sensor is disposed so as to detect an angular speed or rotation about a vertical axis of the vehicle.

What is claimed is:

1. An angular speed sensor, comprising:
   a supporting substrate;
   a first oscillating portion and a second oscillating portion arranged to oscillate in a first direction and in a second direction perpendicular to the first direction, the first and the second oscillating portions being spaced from each other in the first direction;
   a pair of coupling beams extending in the first direction and spaced from each other in the second direction with the first and the second oscillating portions located therebetween, the coupling beams capable of producing standing wave oscillation;
   a plurality of fixing posts fixing the coupling beams to the supporting substrate;
   a first link portion serving as a bridge between the pair of coupling beams and connected to the first oscillating portion, the first link portion including two bridge beams spaced apart from each other in the first direction and each elongated in the second direction to be connected to the coupling beams, the two bridge beams being arranged to flank the first oscillating portion as a whole in the first direction; and
   a second link portion serving as a bridge between the pair of coupling beams and connected to the second oscillating portion, the second link portion including two bridge beams spaced apart from each other in the first direction and each elongated in the second direction to be connected to the coupling beams, the two bridge beams of the second link portion being arranged to flank the second oscillating portion as a whole in the first direction;
   wherein:
   the fixing posts are connected to the coupling beams at fixed points of the standing wave oscillation; and
   the bridge beams of the first and the second link portions each include a widened portion formed at an end thereof connected to the coupling beams, the widened portion being connected to the coupling beams at a fixed point of the standing wave oscillation of the coupling beams.

2. The angular speed sensor according to claim 1, further comprising a first driving unit and a second driving unit, the first driving unit being located opposite to the second oscillating portion with respect to the first oscillating portion and causing the first oscillating portion to vibrate in the first direction, the second driving unit being located opposite to the first oscillating portion with respect to the second oscillating portion and causing the second oscillating portion to vibrate in the first direction, wherein the first and the second driving unit are located between the pair of coupling beams, the first link portion includes a portion serving as a bridge between the pair of coupling beams on an opposite side of the first oscillating portion with respect to the first driving unit and connected to the first driving unit, and the second link portion includes a portion serving as a bridge between the pair of coupling beams on an opposite side of the second oscillating portion with respect to the second driving unit and connected to the second driving unit.

3. The angular speed sensor according to claim 1, wherein the fixing posts are connected to the coupling beams at all the fixed points of the standing wave oscillation.

4. The angular speed sensor according to claim 3, wherein the fixing posts are connected to the coupling beams at points dividing the coupling beams equally in five or nine segments in a longitudinal direction thereof.

5. An electronic apparatus comprising the angular speed sensor according to claim 1.

6. An angular speed sensor, comprising:
   a supporting substrate;
   a first oscillating portion and a second oscillating portion arranged to oscillate in a first direction and in a second direction perpendicular to the first direction, the first and the second oscillating portions being spaced from each other in the first direction;
   a pair of coupling beams extending in the first direction and spaced from each other in the second direction with the first and the second oscillating portions located therebetween, the coupling beams capable of producing standing wave oscillation;
   a plurality of fixing posts fixing the coupling beams to the supporting substrate;
   a first link portion serving as a bridge between the pair of coupling beams and connected to the first oscillating portion, the first link portion including two bridge beams spaced apart from each other in the first direction and each elongated in the second direction to be connected to the coupling beams, the two bridge beams being arranged to flank the first oscillating portion as a whole in the first direction; and
   a second link portion serving as a bridge between the pair of coupling beams and connected to the second oscillating portion, the second link portion including two bridge beams spaced apart from each other in the first direction and each elongated in the second direction to be connected to the coupling beams, the two bridge beams of the second link portion being arranged to flank the second oscillating portion as a whole in the first direction; wherein:

the fixing posts are connected to the coupling beams at fixed points of the standing wave oscillation; and the bridge beams of the first and the second link portions each include a branched portion formed at an end thereof connected to the coupling beams, the branched portion being connected to the coupling beams via at least two positions with a fixed point of the standing wave oscillation arranged therebetween.

7. The angular speed sensor according to claim 6, wherein each of the fixing posts is connected to the coupling beams so as to surround a fixed point of the coupling beams.

8. The angular speed sensor according to claim 6, further comprising a first driving unit and a second driving unit, the first driving unit being located opposite to the second oscillating portion with respect to the first oscillating portion and causing the first oscillating portion to vibrate in the first direction, the second driving unit being located opposite to the first oscillating portion with respect to the second oscillating portion and causing the second oscillating portion to vibrate in the first direction, wherein the first and the second driving unit are located between the pair of coupling beams, the first link portion includes a portion serving as a bridge between the pair of coupling beams on an opposite side of the first oscillating portion with respect to the first driving unit and connected to the first driving unit, and the second link portion includes a portion serving as a bridge between the pair of coupling beams on an opposite side of the second oscillating portion with respect to the second driving unit and connected to the second driving unit.

9. The angular speed sensor according to claim 6, wherein the fixing posts are connected to the coupling beams at all the fixed points of the standing wave oscillation of the coupling beams.

10. The angular speed sensor according to claim 9, wherein the fixing posts are connected to the coupling beams at points dividing the coupling beams equally in five or nine segments in a longitudinal direction thereof.

11. An electronic apparatus comprising the angular speed sensor according to claim 6.

* * * * *